United States Patent
Park

(10) Patent No.: US 8,270,767 B2
(45) Date of Patent: Sep. 18, 2012

(54) SYSTEMS AND METHODS FOR PROVIDING IMMERSIVE DISPLAYS OF VIDEO CAMERA INFORMATION FROM A PLURALITY OF CAMERAS

(75) Inventor: Youngchoon Park, Brookfield, WI (US)

(73) Assignee: Johnson Controls Technology Company, Holland, MI (US)

( * ) Notice: Subject to any disclaimer, the term of this patent is extended or adjusted under 35 U.S.C. 154(b) by 824 days.

(21) Appl. No.: 12/422,116

(22) Filed: Apr. 10, 2009

(65) Prior Publication Data

US 2009/0262206 A1 Oct. 22, 2009

Related U.S. Application Data

(60) Provisional application No. 61/045,553, filed on Apr. 16, 2008, provisional application No. 61/093,232, filed on Aug. 29, 2008.

(51) Int. Cl.
*G06K 9/36* (2006.01)

(52) U.S. Cl. ........ 382/284; 382/238; 382/165; 382/166; 382/236; 382/244; 345/426; 345/420; 345/519; 348/218.1; 348/584

(58) Field of Classification Search .................. 382/284, 382/238, 165, 166, 236, 244; 345/426, 420, 345/519; 348/218.1, 584
See application file for complete search history.

(56) References Cited

U.S. PATENT DOCUMENTS

| | | | |
|---|---|---|---|
| 6,046,745 A | 4/2000 | Moriya et al. | |
| 6,794,987 B2 | 9/2004 | Schiffmann et al. | |
| 7,952,583 B2* | 5/2011 | Waechter et al. | ............. 345/426 |
| 2005/0008240 A1* | 1/2005 | Banerji et al. | ................ 382/238 |
| 2006/0132487 A1 | 6/2006 | Sada et al. | |

FOREIGN PATENT DOCUMENTS

WO   WO 2008/103929 A2   8/2008

OTHER PUBLICATIONS

U.S. Appl. No. 12/135,043, filed Jun. 6, 2008, Park.
Beymer et al., A Real-time Computer Vision System for Measuring Traffic Parameters, pp. 495-501, Jun. 17, 1997.
Caprile et al., Using Vanishing Points for Camera Calibration, International Journal of Computer Vision, vol. 4, No. 2, Kluwer Academic Publishers, 15 pages, 1990.
Casey, J., A Sequel to the First Six Books of the Elements of Euclid, Containing an Easy Introduction to Modern Geometry with Numerous Examples, 5th edition, 3 pages, 1888.

(Continued)

*Primary Examiner* — Mike Rahmjoo
(74) *Attorney, Agent, or Firm* — Foley & Lardner LLP

(57) ABSTRACT

A system for providing stitched video from a first camera and a second camera to an electronic display system includes a processing circuit configured to associate a view a first camera with an approximate location. The processing circuit is further configured to build relationship data between the first camera and a second camera using the approximate location. The processing circuit is further configured to transform video from the first camera relative to video from the second camera, the transformation based on the relationship data. The processing circuit is further configured to use the transformed video to cause the stitched video to be provided to the electronic display system.

15 Claims, 17 Drawing Sheets

OTHER PUBLICATIONS

Chastain, S., Straighten a Crooked Photo and Fix Skewed Perspective with Paint Shop Pro: Setting the Grid for Perspective Correction, http://web.archive.org/web/20060516110012/http://graphissoft.about.com/od/paintshoppro/ss/straighten_7.htm , 1 page, 2006.

Chen et al., New Calibration-free Approach for Augmented Reality Based on Parameterized Cuboid Structure, Proceedings of the Seventh IEEE International Conference on Computer Vision, Kerkyra, Greece, Sep. 20-27, 1990, 10 pages.

Duda et al., Pattern Classification and Scene Analysis, 9 pages, Jun. 1973.

Egenhofer et al., On the Equivalence of Topological Relations, International Journal of Geographical Information Systems, vol. 8, No. 6, pp. 133-152, 1994.

Grammatikopoulos et al., Automatic Estimation of Vehicle Speed from Uncalibrated Video Sequences, International Symposium on Modern Technologies, Education and Professional Practice in Geodesy and Related Fields, Sofia, Bulgaria, Nov. 3-4, 2005, pp. 332-338.

Guttman, A., R-Trees: A Dynamic Index Structure for Spatial Searching, Proceedings of Annual Meeting of ACM Sigmod, vol. 14, No. 2, Boston, Massachusetts, Jun. 18-21, 1984, 13 pages.

Lowe, D.G., Distinctive Image Features from Scale-Invariant Keypoints, International Journal of Computer Vision, Jan. 5, 2004, 28 pages.

Mikic et al., Activity Monitoring and Summarization for an Intelligent Meeting Room, IEEE, 6 pages, 2000.

Park et al., A Logical Framework for Visual Information Modeling and Management, Circuits Systems Signal Processing, vol. 20, No. 2, pp. 271-291, 2001.

Porikli, F., Road Extraction by Point-wise Gaussian Models, Proceedings of SPIE Algorithms and Technologies for Multispectral, Hyperspectral and Ultraspectral Imagery IX, Orlando, Florida, Apr. 21-24, 2003, 8 pages.

Rodriguez, T., Practical Camera Calibration and Image Rectification in Monocular Road Traffic Applications, Machine Graphics and Vision International Journal, vol. 15, No. 1, 23 pages, 2006.

Rowley et al., Neural Network-Based Face Detection, IEEE Transactions on Pattern Analysis and Machine Intelligence, vol. 20, No. 1, 16 pages, Jan. 1998.

Schneidermann et al., A Statistical Method for 3D Object Detection Applied to Faces and Cars, Proceedings of IEEE Conference on Computer Vision and Pattern Recognition, vol. 1, Pittsburgh, Pennsylvania, 7 pages, 2000.

Schoepflin et al., Algorithms for Estimating Mean Vehicle Speed Using Uncalibrated Traffic Management Cameras, taken from http://www.wsdot.wa.gov/research/reports/fullreports/575.1.pdf, 10 pages, Oct. 2003.

Simard et al., Boxlets: A Fast Convolution Algorithm for Signal Processing and Neural Networks, Advances in Neural Information Processing Systems 11, Proceedings of the 1998 Conference, 8 pages.

Song et al., Polygon-Based Bounding Volume as a Spatio-Temporal Data Model for Video Content Access, Proceedings of SPIE, Internet Multimedia Management Systems, Boston, Massachusetts, Nov. 6-7, 2000, 14 pages.

Sturm et al., A Method for Interactive 3D Reconstruction of Piecewise Planar Objects from Single Images, British Machine Vision Conference, vol. 1, 11 pages, 1999.

Tekalp, A., Digital Video Processing, Prentice Hall PTR, Upper Saddle River, New Jersey, 11 pages, Aug. 1995.

Viola et al., Robust Real-Time Face Detection, International Journal of Computer Vision, vol. 57, No. 2, Kluwer Academic Publishers, pp. 137-157, 2004.

Wolberg, G., Digital Image Warping, pp. 47-75, 1990.

Yang et al., A SNoW-Based Face Detector, Advances in Neural Information Processing Systems 12, Proceedings of the 1999 Conference, 9 pages.

Zhao, T., Tracking Multiple Humans in Complex Situations, IEEE Transactions on Pattern Analysis and Machine Intelligence, vol. 26, No. 9, IEEE Computer Society, pp. 1208-1221, Sep. 2004.

International Search Report and Written Opinion for International Patent Application No. PCT/US2008/054762, mailed Sep. 10, 2008, 19 pages.

* cited by examiner

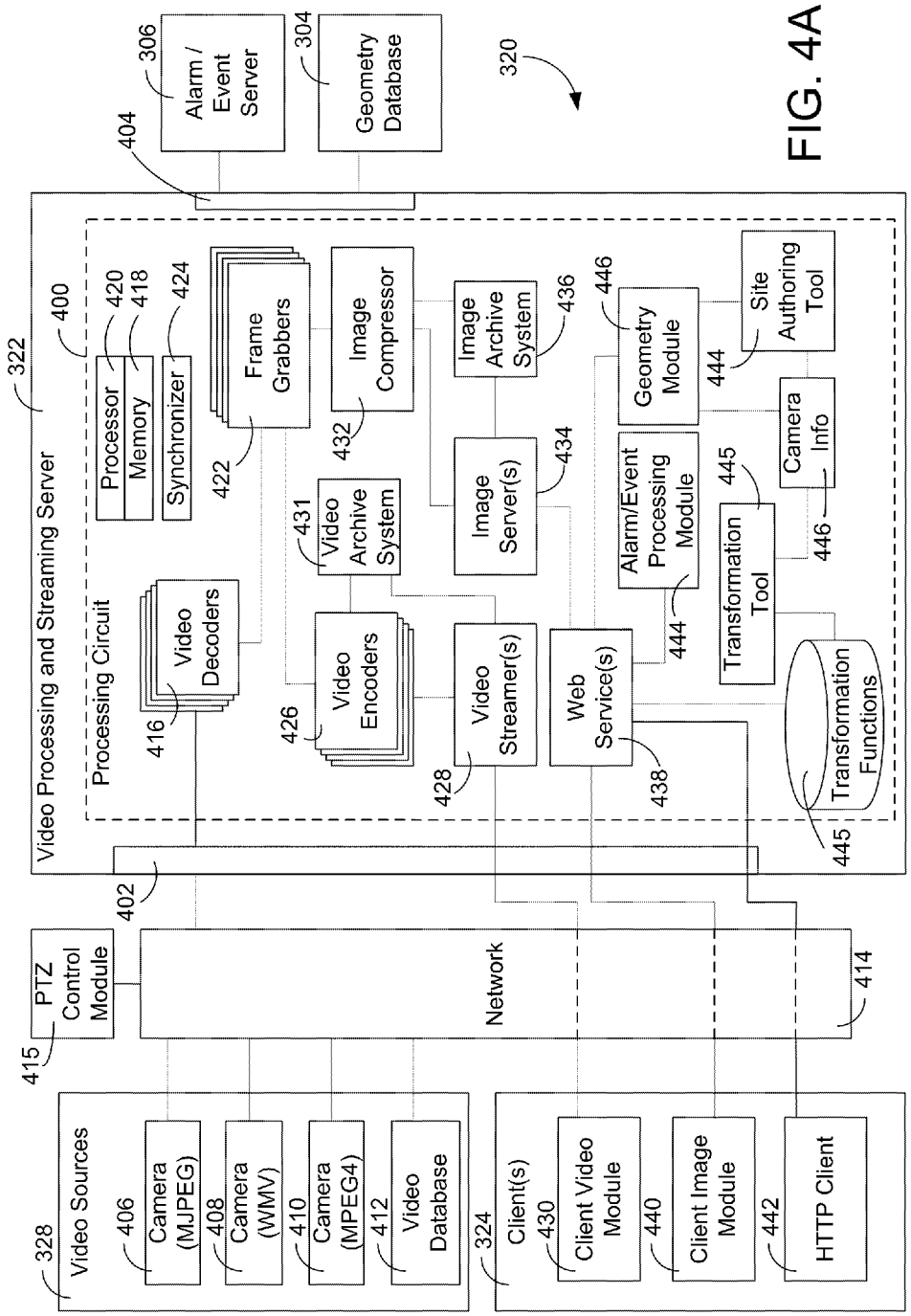

SYSTEMS AND METHODS FOR PROVIDING IMMERSIVE DISPLAYS OF VIDEO CAMERA INFORMATION FROM A PLURALITY OF CAMERAS

CROSS-REFERENCE TO RELATED PATENT APPLICATIONS

The present application claims the benefit of U.S. Provisional Application No. 61/045,553, filed Apr. 16, 2008 and U.S. Provisional Application No. 61/093,232, filed Aug. 29, 2008. U.S. Provisional Application Nos. 61/045,553 and 61/093,232 are hereby incorporated by reference in their entireties.

BACKGROUND

The present disclosure relates generally to the field of video processing. More specifically, the present disclosure relates to the field of video surveillance processing, video storage, and video retrieval.

Conventional video systems display or record analog or digital video. In the context of surveillance systems, the video is often monitored by security personnel and recorded for future retrieval and playback. For systems with multiple cameras, video camera content from different cameras is typically shown on a bank of displays or monitors. Security personnel can interact with the monitor bank via a user interface (e.g., a workstation). A video server receives input from the video cameras and the user interface can be used to control which camera content is displayed at any one time. The monitors are often labeled and an overhead map of an area of interest (e.g., a map of an airport) is provided to the security personnel (typically on paper) so that the security personnel can match a monitor's content to the approximate camera location. When people or objects of interest move from camera to camera, conventional surveillance systems typically do not provide security personnel with an intuitive way to view such movement. For example, security personnel may need to remember that "monitor D" shows an object that has just moved south from the camera corresponding to "monitor K."

The Applicant has identified a need for providing content from a plurality of video cameras to a user (e.g., security personnel, law enforcement officers, process engineers, etc.) in a manner that visually relates the content from different cameras on a single electronic display screen.

SUMMARY

One embodiment relates to a system for providing stitched video from a first camera and a second camera to an electronic display system. The system includes a processing circuit configured to associate a view a first camera with an approximate location. The processing circuit is further configured to build relationship data between the first camera and a second camera using the approximate location. The processing circuit is further configured to transform video from the first camera relative to video from the second camera, the transformation based on the relationship data. The processing circuit is further configured to use the transformed video to cause the stitched video to be provided to the electronic display system.

Another embodiment relates to a system for providing stitched video from a plurality of cameras to an electronic display system. The system includes a processing circuit configured to detect corners in a first image from a first camera and to detect corners in a second image from a second camera. The processing circuit is configured to correlate a plurality of detected corner points in the first image and the second image to obtain a set of most likely pairs. The processing circuit is further configured to calculate triangles formed by corner points relating to the set of most likely pairs. The processing circuit is also configured to correlate calculated triangles in the first image with calculated triangles in the second image. The processing circuit is yet further configured to compute a transformation function between the correlated triangles. The processing circuit is also configured to utilize the transformation function to transform video from at least one of the first camera and the second camera to provide the stitched video to the electronic display system.

Another embodiment relates to a computer program product. The computer program product includes a usable medium having computer readable program code embodied therein. The computer readable program code is adapted to be executed to implement a plurality of steps. The steps include detecting corners in a first image from a first camera, detecting corners in a second image from a second camera, and correlating the detected corners in the first image and the second image to obtain a set of most likely pairs. The steps further include calculating triangles formed by corner points of the set of most likely pairs, computing a transformation function between correlated triangles, and utilizing the transformation function to transform a perspective view provided by the first camera to match a perspective view provided by the second camera.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 4A is a more detailed block diagram of the system of FIG. 3B, according to an exemplary embodiment;

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a system and method for providing graphical user interfaces is shown and described. The graphical user interfaces can include video from multiple video sources. The video from the multiple sources is manipulated to create an immersive display of the information whereby scenes from adjacent cameras are joined (e.g., "stitched") together. A user of the graphical user interfaces can manipulate the scene to change his or her vantage point, and the system will process the user's input to change the joined scene to a new vantage point. The system can use transformed two-dimensional video from a plurality of cameras to provide an expanded display environment.

General System Architecture

Figure 1A:
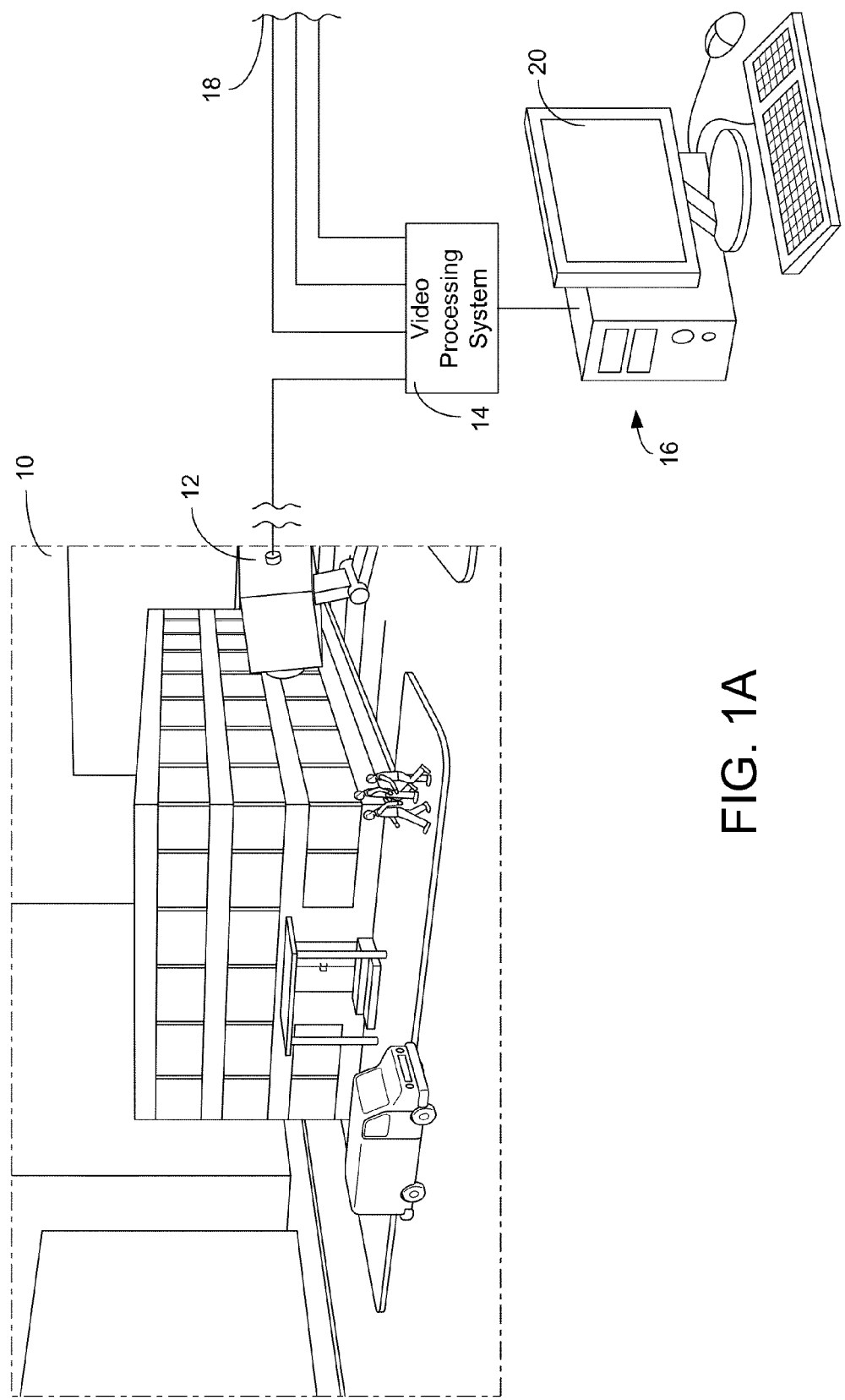
FIG. 1A is a perspective view of a video surveillance system including a video camera, a video processing system, and a client terminal, according to an exemplary embodiment.

Referring to FIG. 1A, a perspective view of a video camera 12, video processing system 14, and client terminal 16 is shown, according to an exemplary embodiment. Video camera 12 may be used for surveillance and security purposes, entertainment purposes, scientific purposes, or any other purpose. Video camera 12 may be an analog or digital camera and may contain varying levels of video storage and video processing capabilities. Video camera 12 is communicably coupled to video processing system 14. Video processing system 14 may receive input from a camera 12 in addition to a plurality of other video inputs 18 (e.g., from other cameras). Video processing system 14 can conduct a variety of processing tasks on data received from the video cameras. For example, the processing tasks may include preparing the video for display on a graphical user interface that can be shown on electronic display 18 of client terminal 16. Via the graphical user interface, video processing system 14 can provide local or remote video monitoring, searching, and retrieval features to client 16.

The environment 10 in which video camera 12 is positioned to capture video from may be an indoor or outdoor area, and may include any number of persons, buildings, cars, spaces, zones, rooms, or any other object or area that may be either stationary or mobile. The communication connection between the video cameras and the video processing system 14 may be wired, wireless, analog, digital, internet protocol-based, or use any other suitable communication systems, methods, or protocols.

Figure 1B:
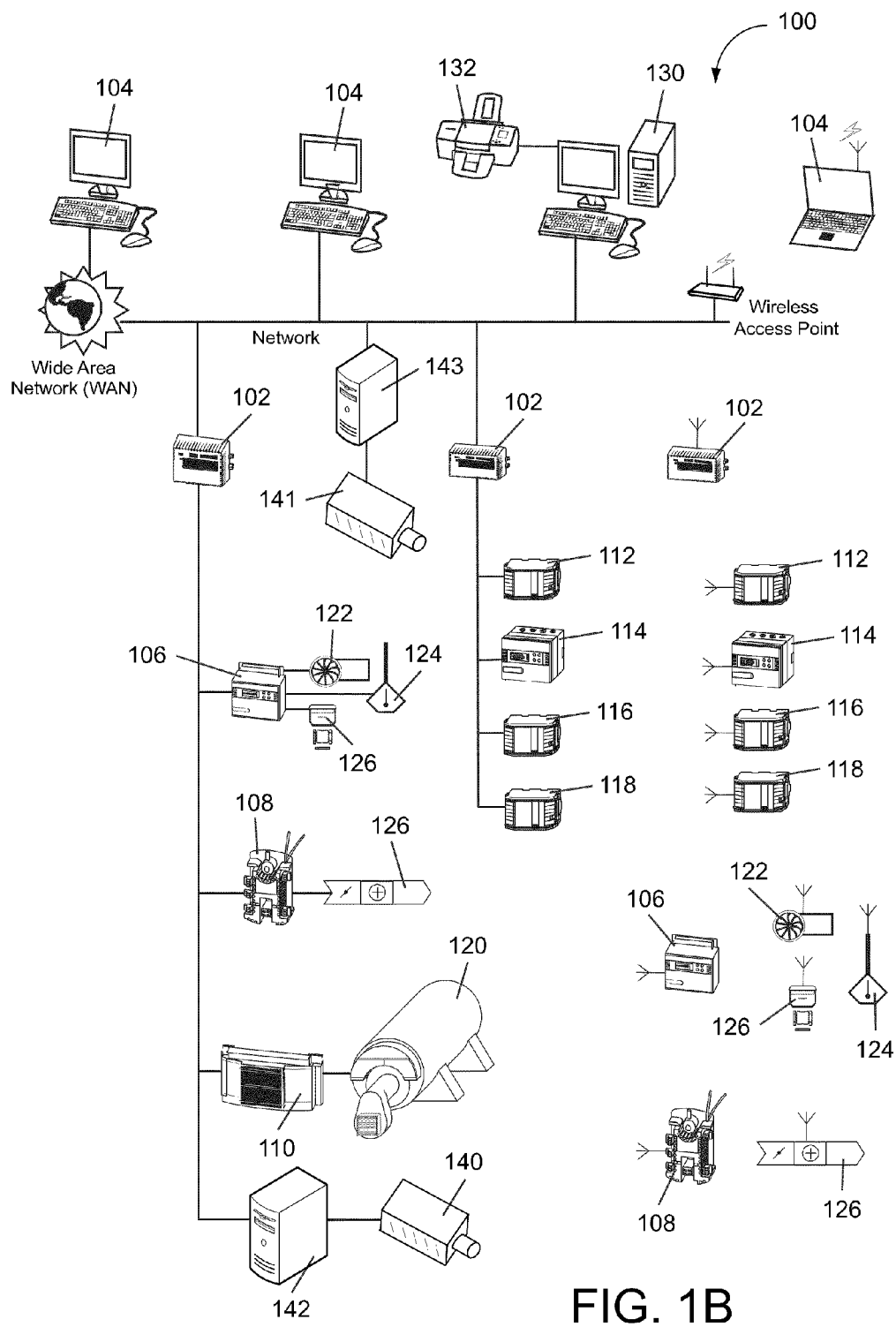
FIG. 1B is a diagram of a building automation system having a plurality of cameras and a video processing system, according to an exemplary embodiment.

Referring now to FIG. 1B, a building automation system (BAS) 100 having video processing capabilities is shown, according to an exemplary embodiment. A BAS is, in general, a hardware and software system configured to control, monitor, and manage equipment in or around a building or building area. The BAS as illustrated and discussed in the disclosure is an example of a system that may be used in conjunction with the system and methods of the present disclosure; however, other building systems may be used as well. Video processing hardware and software (e.g., central database management system software, web server software, querying software, interface software, etc.) may reside on various computing devices of BAS 100 (e.g., an application and data server, a web server, an enterprise server, a network automation engine, etc.). Cameras with video processing capabilities may be communicably connected to BAS 100. For example, cameras 140 and 141 are shown as components of or connected to BAS 100. Camera 141 and video processing system 143 are shown coupled to a network (which could be a building LAN, a WAN, an Ethernet network, an IP network, etc.).

BAS 100 may include one or more supervisory controllers (e.g., a network automation engine (NAE)) 102 connected to a proprietary or standard communications network such as an IP network (e.g., Ethernet, WiFi, ZigBee, Bluetooth, etc.). Supervisory controllers 102 may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee, and any number of other standard or proprietary field-level building management protocols and/or technologies. Supervisory controllers 102 may include varying levels of supervisory features and building management features. The user interface of supervisory controllers 102 may be accessed via terminals 104 (e.g., web browser terminals) capable of communicably connecting to and accessing supervisory controllers 102. For example, FIG. 1B shows multiple terminals 104 that may variously connect to supervisory controllers 102 or other devices of BAS 100. For example, terminals 104 may access BAS 100 and connected supervisory controllers 102 via a WAN, an Internet location, a local IP network, or via a connected wireless access point. Terminals 104 may also access BAS 100 and connected supervisory controllers 102 to provide information to another source, such as printer 132.

Supervisory controllers 102 may be connected to a variety of BAS devices. The devices may include, among other devices, field equipment controllers (FECs) 106 such as field-level control modules, variable air volume modular assemblies (VMAs) 108, integrator units, room controllers 110, 112 (e.g., a variable air volume (VAV) device or unit such as a VAV box), other controllers 114, unitary devices 116, zone controllers 118 (e.g., an air handling unit (AHU) controller), boilers 120, fan coil units 122, heat pump units 124, unit ventilators 126, expansion modules, blowers, temperature sensors, flow transducers, other sensors, motion detectors, actuators, dampers, heaters, air conditioning units, etc. These devices may generally be controlled and/or monitored by supervisory controllers 102. Data generated by or available on the various devices that are directly or indirectly connected to supervisory controllers 102 may be passed, sent, requested, or read by supervisory controllers 102 and/or sent to various other systems or terminals 104 of BAS 100. The data may be stored by supervisory controllers 102, processed by supervisory controllers 102, transformed by supervisory controllers 102, or sent to various other systems or terminals 104 of the BAS 100. As shown in FIG. 1B, the various devices of BAS 100 may be connected to supervisory controllers 102 with a wired connection or with a wireless connection.

Still referring to FIG. 1B, an enterprise server 130 (e.g., an application and data server (ADS)) is shown, according to an exemplary embodiment. Enterprise server 130 is a server system that includes a database management system (e.g., a relational database management system, Microsoft SQL Server, SQL Server Express, etc.) and server software (e.g., web server software, application server software, virtual machine runtime environments, etc.) that provide access to data and route commands to components of BAS 100. For example, enterprise server 130 may serve user interface applications. Enterprise server 130 may also serve applications such as Java applications, messaging applications, trending applications, database applications, etc. Enterprise server 130 may store trend data, audit trail messages, alarm messages, event messages, contact information, and other BAS-related data. Terminals may connect to enterprise server 130 to access the entire BAS 100 and historical data, trend data, alarm data, operator transactions, and any other data associated with BAS 100, its components, or applications. Various local devices such as printer 132 may be attached to components of BAS 100 such as enterprise server 130.

Still referring to FIG. 1B, BAS 100 may include one or video cameras 140, 141 and associated video processing system hardware 142, 143. According to one exemplary embodiment, camera 140 and video processing system hardware 142 may be connected to a general purpose network. According to another exemplary embodiment, camera 141 and video processing system hardware 143 may be connected to supervisory controller 102. Cameras 140, 141 and hardware 142, 143 may be communicably coupled to BAS 100 in a variety of ways (e.g., via a BAS communications bus, via a building LAN, WAN, Ethernet connection, etc., via a wireless connection, via a dedicated video bus, etc.). Cameras 140, 141 and hardware 142, 143 may interact with BAS 100 as described herein (e.g., to retrieve device location information, to obtain security information, to obtain alarm/event information, etc.). BAS 100 may include METASYS building automation components sold by Johnson Controls, Inc. BAS 100 may also (or alternatively) include the P2000 Security Management System sold by Johnson Controls, Inc. According to some exemplary embodiments, as an alternative to the video processing system hardware 142, 143, the video processing hardware and software described in the present application can be implemented in a supervisory controller, an application and data server, or an enterprise server of a BAS.

Figure 1C:
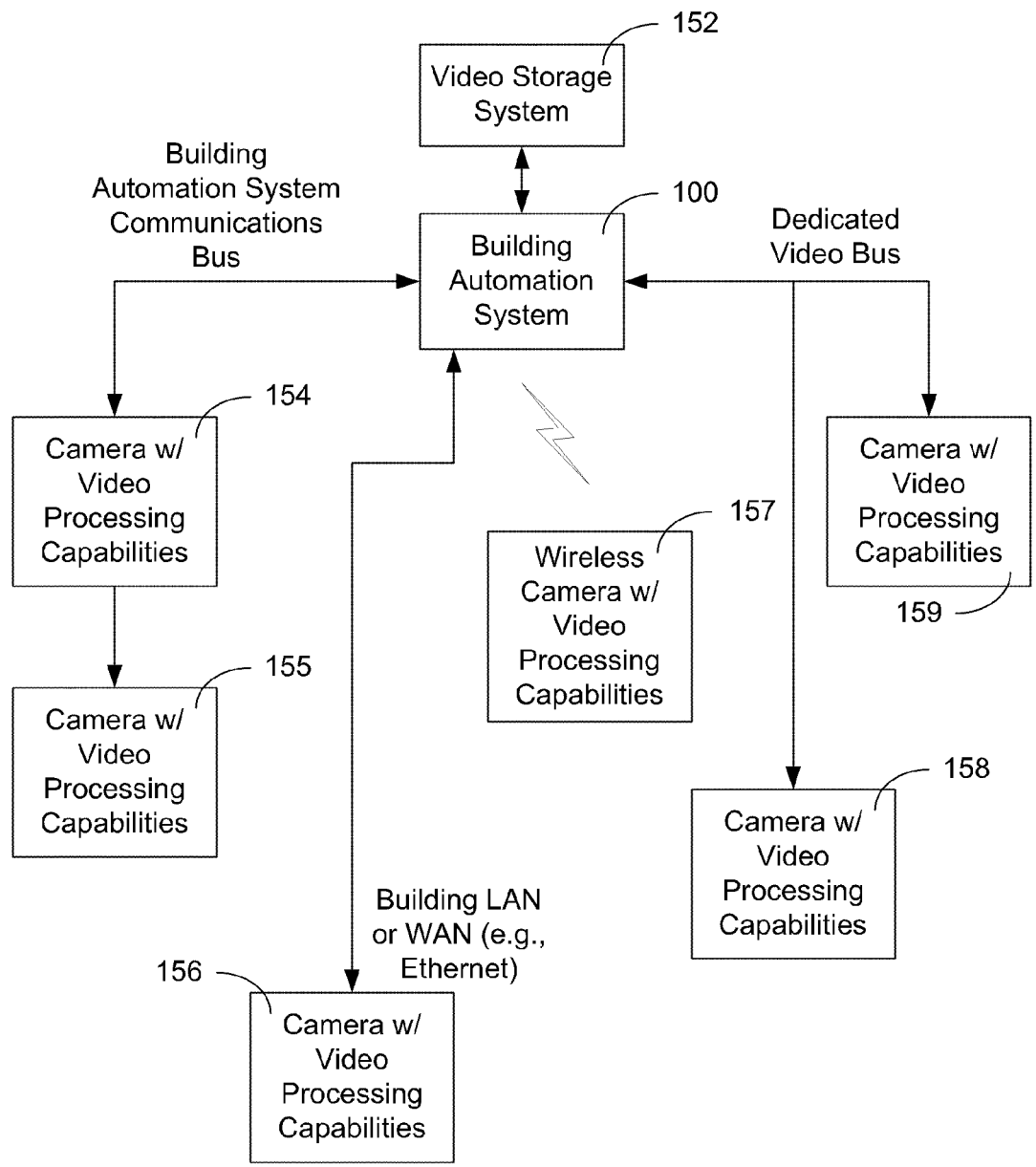
FIG. 1C is a block diagram of a building automation system, including video processing capabilities, according to an exemplary embodiment.

Referring to FIG. 1C, BAS 100 is shown to have video processing capabilities, according to an exemplary embodiment. Video processing may be done in a distributed fashion and the systems (communication systems, processing systems, etc.) of BAS 100 may be able to execute and support a distributed video processing system. For example, BAS 100 may be able to serve or otherwise provide a query interface for a video processing system. The data of the video surveillance system may be communicated through the various data buses or other communications facilities of BAS 100.

Some video processing software (e.g., central database management system software, web server software, querying software, interface software, etc.) may reside on various computing devices of BAS 100 (e.g., application and data server, web server, network automation engine, etc.). Cameras with video processing capabilities may be communicably connected to BAS 100. For example, cameras 154 and 155 are shown using a BAS communications bus, camera 156 is shown using a building LAN, WAN, Ethernet connection, etc., camera 157 is shown using a wireless connection, and cameras 158 and 159 are shown using a dedicated video bus. A supplemental video storage system 152 may be coupled to BAS 100. Other video processing devices may be distributed near the cameras. Cameras 154-159 with video processing capabilities may have embedded processing hardware and/or software or may be cameras connected to distributed processing devices.

Figure 2A:
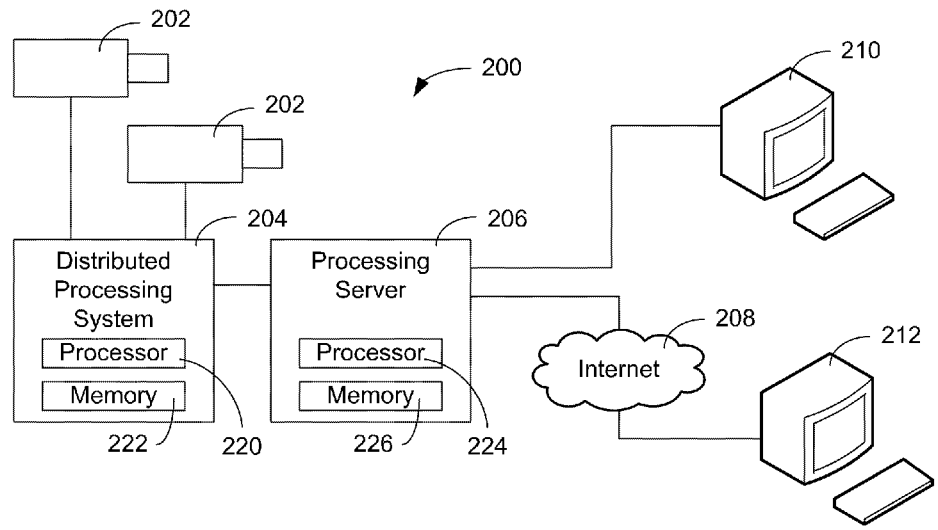
FIGS. 2A-B are block diagrams of video processing systems, according to exemplary embodiments.

Referring now to FIG. 2A, a block diagram of a video processing system 200 is shown, according to an exemplary embodiment. Digital or analog cameras 202 are shown communicably coupled to a distributed processing system 204. Distributed processing system 204 is shown communicably coupled to a central database or processing server 206. Clients 210 and 212 are shown connected to processing server 206. Clients 210 or 212 may be connected to server 206 via a direct connection, a network connection, a wired connection, a wireless connection, a LAN, a WAN, or by any other connection method. Clients 210 or 212 may also be connected to the server via an Internet connection 208. System 204 may include a processor 220 and memory 222 and server 206 may include a processor 224 and memory 226.

Figure 2B:
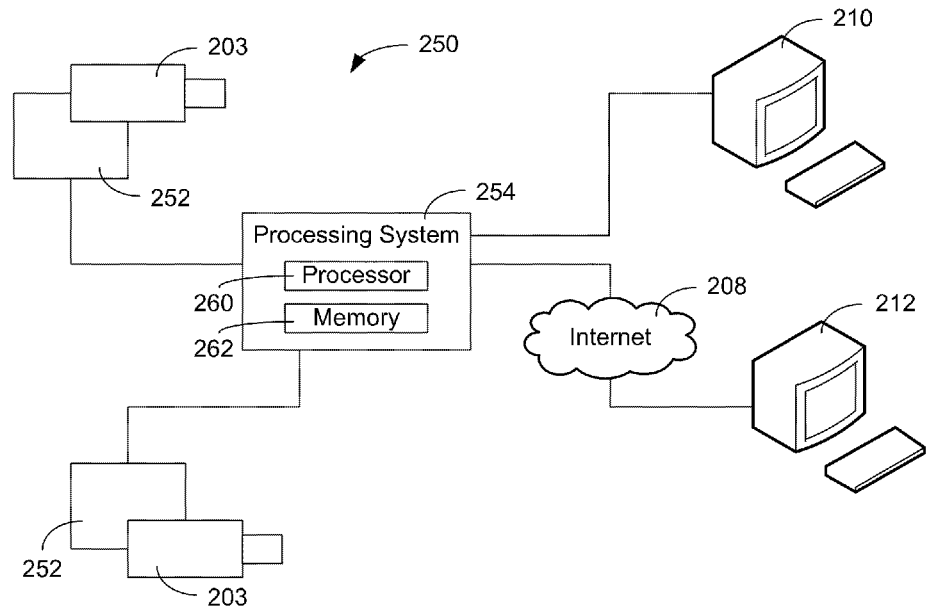

Referring to FIG. 2B, a block diagram of a video processing system 250 is shown, according to another exemplary embodiment. Video processing system 250 may include digital or analog video cameras 203 communicably coupled to a processing system 254. System 254 may include a processor 260 and memory 262. Video camera 203 may include different levels of video processing capabilities ranging from having zero embedded processing capabilities (i.e., a camera that provides an unprocessed input to a processing system) to having a significant camera processing component 252. When a significant amount of video processing is conducted away from a central processing server, video processing system 254 may be referred to as a distributed video processing system (e.g., distributed processing system 204 of FIG. 2A). According to various exemplary embodiments, the majority of the video processing is conducted in a distributed fashion. According to other exemplary embodiments, over eighty percent of the processing is conducted in a distributed fashion. Highly distributed video processing may allow video processing systems that scale to meet user needs without significantly upgrading a central server or network. In yet other exemplary embodiments, the video processing is conducted by a processing server and is not substantially distributed away from the processing server.

Referring further to FIGS. 2A-2B, processing systems 200, 250 are shown to include a processor and memory. The processor may be a general purpose processor, an application specific processor, a circuit containing processing components, a group of distributed processing components, a group of distributed computers configured for processing, etc. The processor may be or include any number of hardware components for conducting data or signal processing or for executing computer code stored in memory. A processor may also be included in cameras 202, 203 (e.g., in camera processing component 252). The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3A:
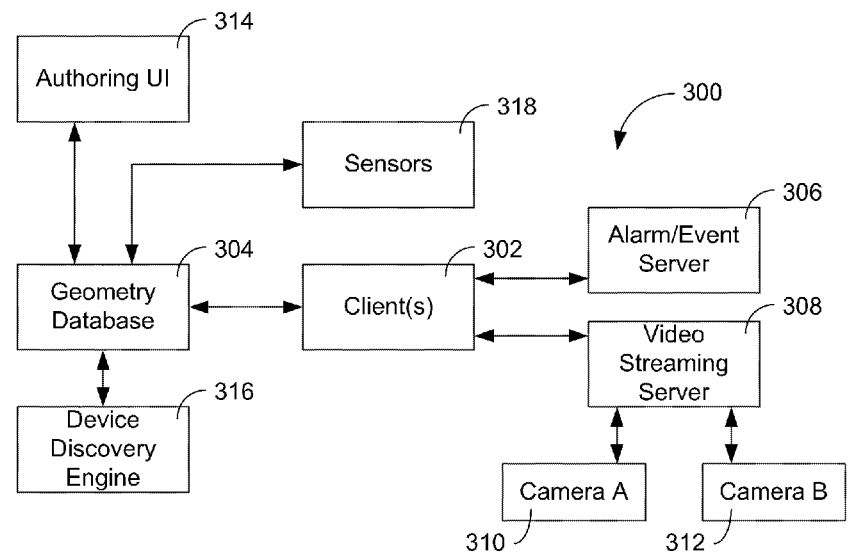
FIGS. 3A-C are block diagrams of systems for providing video to a graphical user interface, according to exemplary embodiments.

Referring now to FIG. 3A, a block diagram of a system 300 for providing video to a graphical user interface is shown, according to an exemplary embodiment. System 300 is a system wherein a relatively large amount of the graphical user interface processing activities are conducted by client(s) 302. Client 302 is shown communicably coupled to geometry database 304, alarm/event server 306, and video streaming server 308.

Geometry database 304 is configured to store information regarding the placement, geospatial location, orientation, and properties of devices relative to the environment in which they are placed. According to various exemplary embodiments, geometry database 304 also stores information regarding the placement, geospatial location, orientation, and properties of devices relative to each other. The devices for which geometry information is stored include cameras 310 and 312. The devices for which geometry information is stored can also include BAS devices (e.g., occupancy sensors, movement sensors, door access systems, building doors, etc.).

Geometry database 304 may be stored in a memory device of a BAS, a dedicated storage server, the video streaming server, or otherwise. Geometry database 304 can be populated and updated in a variety of ways. For example, geometry database 304 can be populated and updated using an authoring user interface (UI) 314 as described in U.S. application Ser. No. 12/135,043, filed Jun. 6, 2008, the entirety of which is hereby incorporated by reference. Geometry database 304 can also be populated and updated using one or more device discovery engines 316. A device discovery engine is a system (or software module of a video streaming server) configured to determine the geometry information (e.g., placement, geospatial location, orientation, environment properties, device properties, etc.) relating to a device without human interaction (or with reduced human interaction). For example, a module embedded in each device (e.g., cameras 310, 312) can communicate self-determined information (e.g., GPS coordinates, building coordinates, room of occupancy, field of view, etc.) to device discovery engine 316. Device discovery engine 316 can store the information in geometry database 304 and derive geometry information for storing in geometry database 304 from the information communicated to it by the modules embedded in the devices. According to other exemplary embodiments, each device includes a device discovery module that the device is able to execute to determine its own geometry information. The device is then configured to communicate its geometry information to geometry database 304.

Referring further to FIG. 3A, an alarm/event server 306 is shown communicably coupled to client 302. Alarm/event server 306 can be a BAS controller (e.g., supervisory controller, enterprise controller, etc.) configured to store and provide alarm/event information to client 302 (e.g., on a pushed basis, on request, etc.). The alarm/event information provided to client 302 can be information directly relating to cameras 310 and 312. For example, if camera 312 is determined to be malfunctioning, this information would be communicated from alarm/event server 306 to client 302 for display to a user. According to other exemplary embodiments, alarm/event server 306 can be configured to associate a camera field of view or another property (e.g., camera location, camera proximity, etc.) with inputs received from a BAS device such as an occupancy sensor. When client 302 receives information from alarm/event server 306 indicating that a certain building space is occupied, client 302 can use the information to automatically select and display video from a camera pointed toward a field of view coinciding with the area sensed by the occupancy sensor. U.S. application Ser. No. 12/135,043 describes other ways in which an alarm/event server can be used with video processing systems, cameras, and/or geometry data.

Sensors 318 are shown communicably coupled to geometry database 304. Sensors 318 can include any number or type of non-camera sensors that can provide inputs to the system (e.g., temperature sensors, proximity sensors, occupancy sensors, infrared sensors, etc.). Sensors 318 can also be configured to provide inputs to video streaming server 308 and alarm/event server 306. Using geometry information (e.g., location information and information regarding correlations between sensors and cameras, sensors and other sensors, or sensors and building locations) stored in geometry database 304, the client 302, the video streaming server 308, or the alarm/event server 306 can be configured to make automated decisions regarding any number of user interface activities. For example, alarm/event server 306 can be configured to suppress or advance alarms or events based on consistencies between data provided by one sensor relative to data provided by another sensor and/or a camera. Geometry information for sensors stored in geometry database 304 may be populated or updated based on activities such as those described in U.S. application Ser. No. 12/135,043. For example, an estimation of location may be set based on user input to a floor plan while mathematical relationships are used to correlate sensors (or other building devices) to each other or to building spaces.

Figure 3B:
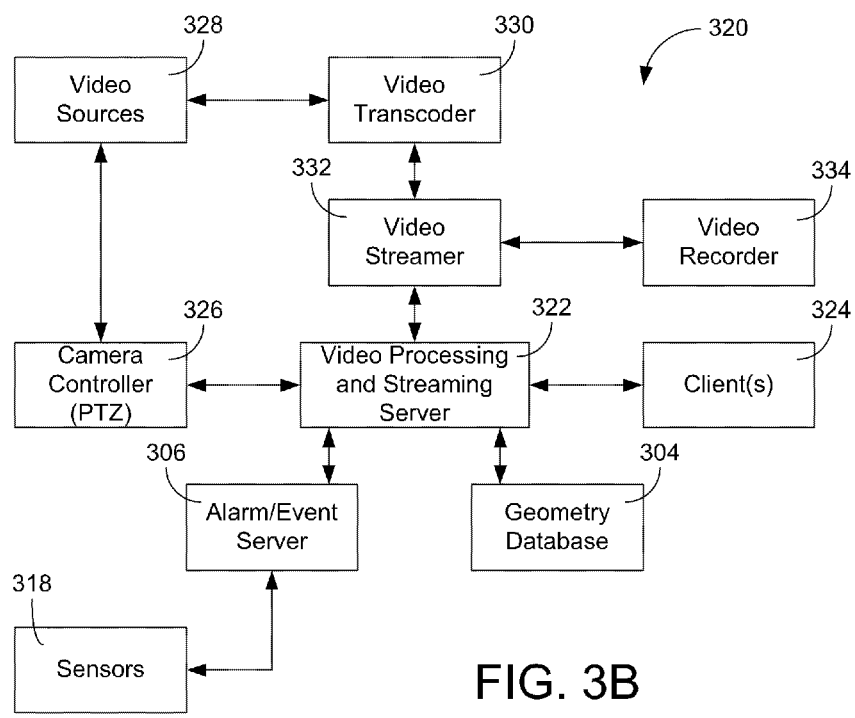

Referring now to FIG. 3B, another exemplary system 320 for providing video to a graphical user interface is shown. In the embodiment of FIG. 3B, a video processing and streaming server 322 conducts a larger portion of the processing and generation of the content for the graphical user interfaces provided to clients 324 than video streaming server 308 of FIG. 3A. Accordingly, client(s) 324 of the embodiment shown in FIG. 3B can be "thin" clients (e.g., web browser-based clients) storing little of the processing code or data specific to the generation of the graphical user interface.

Video processing and streaming server 322 is communicably coupled to a camera controller 326. According to an exemplary embodiment, camera controller 326 may be a pan, tilt, and zoom (PTZ) controller, allowing for control of the tilt or zoom of the camera as well as the area in which the camera may pan over. Camera controller 326 is coupled to video sources 328 and may provide video sources 328 or video processing and streaming server 322 with camera configuration information.

Video processing and streaming server 322 may receive video obtained from video sources 328 via video transcoder 330 and video streamer 332. Using video obtained from video sources 328, video processing and streaming server 322 is configured to provide transcoded or otherwise prepared video information (e.g., streams, transcoded files, etc.) to clients 324 for display via a graphical user interface. Further, video processing and streaming server 322 can use geometry data from geometry database 304 for forwarding geometry information to clients 324. Video streaming server 332 can also use the geometry data or alarm/event data from server 306 for making any number of processing decisions that may affect the data/information provided to clients 324.

Video transcoder 330 may be coupled to video sources 328 and may receive a video input from sources 328. Sources 328 may include any number of cameras, security system video archives, or other video providing sources (e.g., another video processing system). Video transcoder 330 may be generally configured to accept the video input and to transcode the input for video streamer 332 and video processing and streaming server 322. Transcoding may include compressing the video, encrypting the video, converting the video from one format to another, or the like.

Video streamer 332 may be configured to receive a video input from transcoder 330 and to stream the video input. Video streamer 332 may be coupled to server 332 and provide or receive a video input for processing or streaming. Video streamer 332 may prepare and control video received from the transcoder for transmission to clients 324. The preparation and control may include packaging, negotiating, and transmitting the video according to a streaming media protocol (e.g., the real time streaming protocol (RTSP), a real-time transport protocol (RTP), etc.).

Video recorder 334 may be coupled to video streamer 332 and may archive video received from video streamer 332. In some exemplary embodiments, video transcoder 330, video streamer 332, video recorder 334, and video processing and streaming server 322 may be configured differently. For example, in some embodiments, raw video received from video sources 328 may be recorded or archived by video recorder 334 prior to any transcoding, streaming, or processing activities. In yet other embodiments, the video is processed prior to transcoding or streaming.

In FIG. 3B, sensors 318 are shown communicably coupled to alarm/event server 306. As described above, sensors 318 can include any number or type of non-camera sensors that can provide inputs to the system (e.g., temperature sensors, proximity sensors, occupancy sensors, infrared sensors, etc.). Sensors 318 can also be configured to provide inputs to video processing and streaming server 322 and alarm/event server 306. Using geometry information (e.g., location information and information regarding correlations between sensors and cameras, sensors and other sensors, or sensors and building locations) stored in geometry database 304, the client 302, the video processing and streaming server 322, or the alarm/event server 306 can be configured to make automated decisions regarding any number of user interface activities. For example, the alarm/event server can be configured to suppress or advance alarms or events based on consistencies between data provided by one sensor relative to data provided by another sensor and/or a camera. Further, video processing and streaming server 322 may be configured to automatically provide a camera view on the user interface that is calculated to provide a good viewing angle of a space relating to an alarm or event initiated based on sensor 318 activity. For example, if one of sensors 318 detects a fire in a first building space, alarm/event server 306 may be configured to forward this information to video processing and streaming server 322. With this information, video processing and streaming server 322 may be configured to rotate, zoom, or otherwise change a video scene shown on clients 324 so that the first building space is shown. Accordingly, when a problem or event is detected, client 324 can immediately (or nearly immediately) change so that personnel can view the potential problem or event—rather than having to manually switch to a relevant camera. Prior to switching, however, alarm/event server 306 or video processing and streaming server 322 may be configured to check the event for consistency with inputs provided from one or more other sensors 318, reducing the number or frequency of false scene changes at clients 324.

Figure 3C:
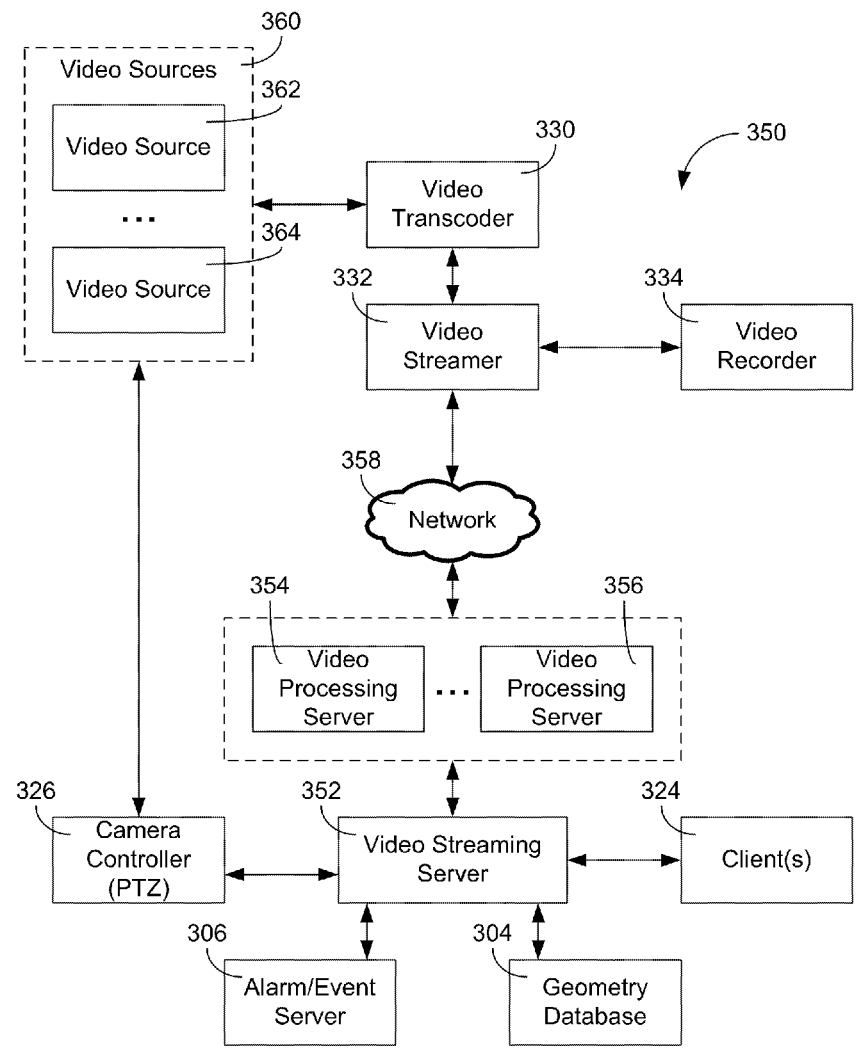

Referring now to the embodiment shown in FIG. 3C, a system 350 for providing the distributed processing of video from a plurality of video sources 360 is shown, according to an exemplary embodiment. In system 350, video streaming server 352 may be configured to receive the same information and cause the same graphical user interface to be generated as are provided by clients 302 and 324 of FIGS. 3A-B. In the embodiment shown in FIG. 3C, however, the back-end video processing of system 350 is distributed (e.g., distributed to different machines, different processors, etc.). Multiple video processing servers (e.g., video processing servers 354 and 356) are included with system 350 for providing processed video to video streaming server 352. In systems having video from many video sources 360 (e.g., multiple video sources 362-364) or high resolution video sources, the distributed nature of video processing servers 354, 356 may provide system 350 with improved display capabilities. According to an exemplary embodiment, video sources 360 are connected to a common network 358 (e.g., a high-speed video bus, an Ethernet network, an IP-compatible network, etc.). In the embodiment of system 350, sources 360 are coupled to network 358 via a video transcoder 330 and video streamer 332. Video processing servers 354 and 356 are also communicably coupled to network 358. Certain video processing servers can be configured to receive and process video from certain specific video sources. Also (or alternatively), some video processing servers can be configured to receive and process video from any of the available video sources. It should be noted that one or more of the video sources 360 can be video databases stored on one or more video storage devices (e.g., hard disks, optical disks, solid-state memory, etc.). In an embodiment where one or more video sources 360 are video databases, cameras of the system feed video information to the databases for processing by video processing servers 354, 356. Geometry database 304 can be local to video streaming server 352 or may be connected via a remote/networked connection. Alarm/event server 306 is shown as local to video streaming server 352 but could be communicably connected to one or more of the other system components (e.g., clients 324).

Referring now to FIG. 4A, a close-up and more detailed block diagram of system 320 shown in FIG. 3B is illustrated, according to an exemplary embodiment. System 320 is shown to include video processing and streaming server 322, video sources 328, and client(s) 324. Server 322 generally receives video streams from video sources 328, transcodes the video to another format and/or bit rate, and provides both the streaming video and non-streaming video components of the graphical user interface to client(s) 324 for display. Server 322 is shown to include processing circuit 400 and communications interfaces 402 and 404.

Communications interfaces 402 and 404 are one or more devices for facilitating communications between server 322 and other connected devices (e.g., video sources 328, client(s) 324, alarm/event server 306, geometry database 304, etc.). Communications interfaces 402 and 404 can be Ethernet interfaces, WiFi interfaces, IEEE 802.11 interfaces, IEEE 802.15 interfaces, optical communications interfaces, or any other interfaces configured to facilitate wired and/or wireless communications. Communications interfaces 402, 404 can include a jack, a terminal, a plug-in location, or any other hardware for physically connecting a wire. Communications interfaces 402, 404 may include an antenna if communications interfaces 402, 404 are configured for wireless communications. Communications interfaces 402, 404 can be standard communications interfaces configured for communications via standard IT and/or IP protocols. Communications interfaces 402, 404 can also (or alternatively) be configured to communicate using proprietary communications protocols or security or building automation system protocols. Communications interfaces 402 and 404 may be different or the same. For example, communications interface 402 could be a standard IT interface (e.g., an Ethernet card with appropriate software) while communications interface 404 could be a proprietary interface (e.g., circuitry for communicating with a proprietary building automation system bus, circuitry for communicating using a proprietary security network, etc.).

Referring still to FIG. 4A, video sources 328 are shown to include a plurality of cameras 406-410 and a video database 412. As shown, each of cameras 406-410 provide different digital video output (e.g., MJPEG, MPEG 4, WMV, etc.). It should be appreciated that video sources 328 may include any number of cameras. Some of the cameras may be the same and others may be different. The output provided by the cameras can be compressed and formatted in any number of standard or proprietary formats. Additional video can be stored in one or more video databases that can be local or remote from system 320 and server 322. A video database (and accompanying processing circuitry) can be configured to record and archive video received from the plurality of cameras as described in U.S. application Ser. No. 12/036,053, filed Feb. 22, 2008. It should be noted that one or more of cameras 406-410 may be analog cameras configured to provide analog video signals, with server 322 or an intermediate component providing analog-to-digital conversion.

Network 414 can be a single LAN, a WAN, multiple different networks, a wired network, a wireless network, or any other suitable network for sending and receiving video information. The portion of network 414 between video sources 328 and server 322 may be a specialized video bus or high-speed video network. The portion of network 414 between server 322 and client(s) 324 may be a standard WAN, LAN, an Ethernet-based network (e.g., 10Base-T, 100Base-T, 1000Base-T, etc.), the Internet, or any other suitable network. According to various embodiments the network 414 between server 322 and sources 328 and the network 414 between server 322 and client(s) 324 is the same network.

Video processing and streaming server 322 is shown to include processing circuit 400 having a variety of components for processing video and for serving graphical user interface components (e.g., video, html, etc.) to client(s) 324. Digital video received from video sources 328 (e.g., via network 414 and communications interface 402) is received by video decoders 416. Video decoders 416 may include at least one decoding module (e.g., executable computer-code stored in a memory device for decoding video) per codec or format received from video sources 334. Video decoders 416 may be configured to temporarily store decoded video sequences in memory device 418 or in another memory device of or connected to server 322.

After decoding, the decoded video sequences (e.g., raw image sequences with timing information) are then processed by frame grabbers 422. Frame grabbers 422 are devices or modules that capture a subset of the frames provided to it by video decoders 416. According to an exemplary embodiment, frame grabbers 422 are synchronized (e.g., by synchronizer 424). This synchronization process can, for example, be based on a clock signal of processing circuit 400, based on time information provided with the video information from the video sources, or otherwise. The synchronization can be configured to ensure that frames of the same time and content are used in later processing and streaming.

Frames grabbed by frame grabbers 422 can then provide the video to video encoders 426. Video encoders 426 are configured to encode and compress the raw images they receive into one or more video formats for use by video streamer(s) 428 and client video module 430. One or more encoded video signals streams or files can be used by video streamer(s) 428. According to an exemplary embodiment, video encoder(s) 426 is a Windows VC-1 encoder and video streamer(s) 428 is a VC-1 streamer (e.g., configured to operate via a session initiation protocol). According to yet other exemplary embodiments, client module 430 and video streamer(s) 428 are Microsoft Silverlight components (or Silverlight compatible components).

Figure 5A:
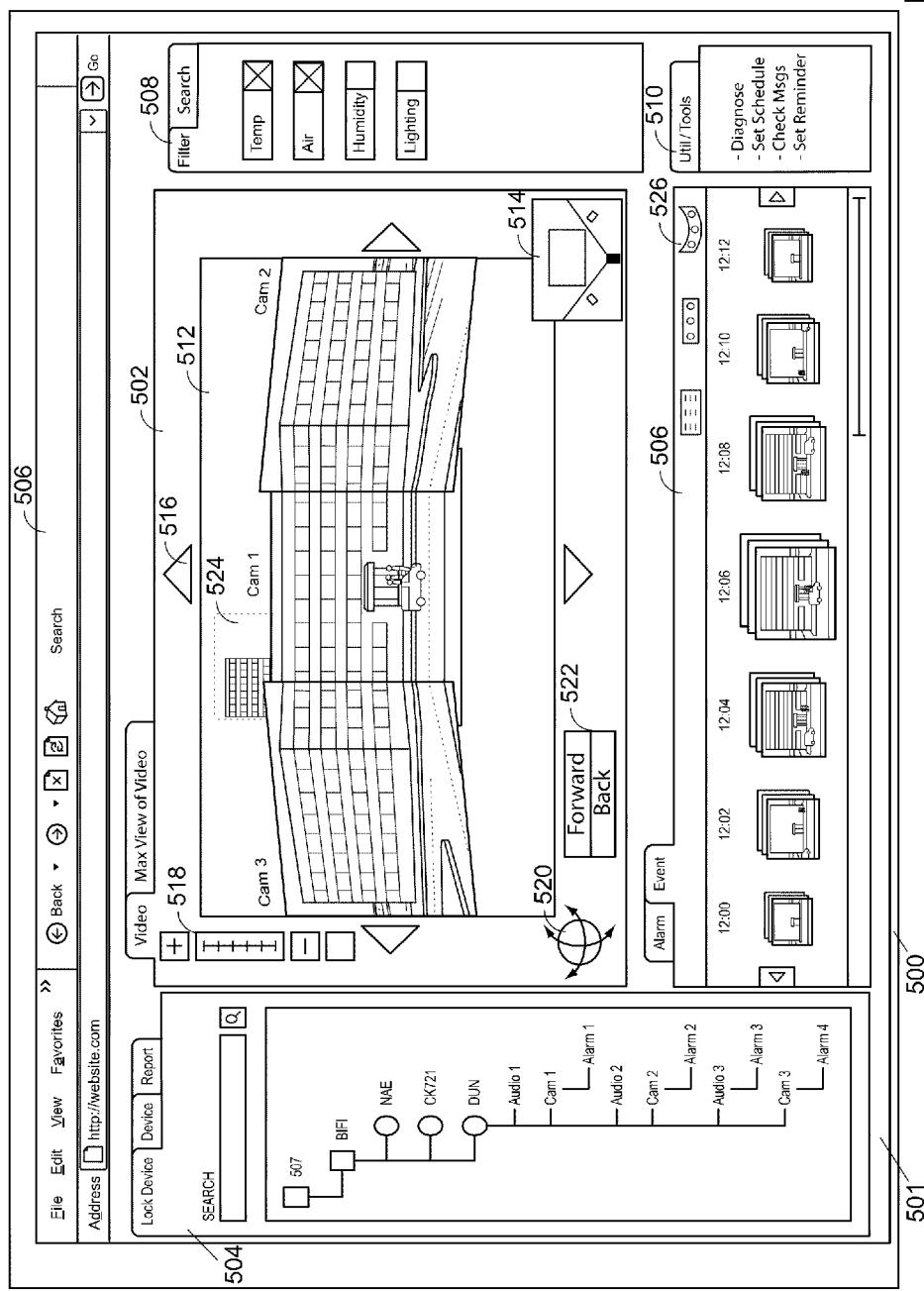
FIG. 5A is an illustration of a graphical user interface view that can be generated and displayed using the systems and methods of the present disclosure, according to an exemplary embodiment.

According to an exemplary embodiment, frame grabbers 422 and video streamers 428 are configured to normalize video data originating from differing video sources. For example, if one video source records at 30 frames per second (fps) and at a first resolution and another video source records at 10 fps at another resolution, the frame grabber can be configured to select frames from the 30 fps source corresponding to each frame of the 10 fps source. Further, the frame grabber can be configured to adjust the resolution, size, or any other characteristics of the video from the multiple sources to match. According to an exemplary embodiment, the frame grabber synchronizes and normalizes the video from the multiple sources so that when the video is joined (e.g., as shown in FIG. 5A) the join appears natural and as if the video originated from one camera.

Video archive system 431 can be configured to store, further compress, or otherwise archive video in memory. The video can be stored with meta-data or descriptive elements.

In addition to video, still images may be shown on the displayed graphical user interface. Image compressor 432, image server(s) 434, and image archive system 436 can all be configured to receive images from frame grabbers 422. These components can be used, for example, to provide thumbnail images of the video to client 340 and store "snapshots" of events (e.g., a snapshot of a scene when an alarm is triggered).

Web services 438 may include any number of web service components or modules. For example, web services 438 can include an image service, an html component, a SOAP component, an XML component, etc. Client module 440 can be a software module configured to communicate with web services 438 (e.g., image service). HTTP client 442 can be a client for communication using HTTP. Alarm/event processing module 444 can be configured to access or receive information available from alarm/event server (or a local memory device of server 322). Geometry module 446 can be configured to access or receive information available from geometry database 338. Modules 444 and 446 can include logic for using the information received from server 306 and database 304 to provide formatted information to web service(s) 438 followed by client 324.

A PTZ control module 415 may be coupled to network 414 and may generally be configured to provide commands to video sources 328 or provide video source information (e.g., regarding a current camera zoom level, a current tilt parameter, a current pan angle, etc.) to network 414 for use by video processing and streaming server 322. PTZ control module, according to various exemplary embodiments, may be integrated inside one or more cameras, video processing and streamliner server 322, or otherwise.

Server 322 further includes transformation tool 443, a site authoring tool 444, transformation functions database 445, and camera information 446. An exemplary transformation tool 443 is shown in greater detail in FIG. 9. Transformation tool 443 is generally configured to provide "stitched" video or to calculate parameters for providing "stitched" video such that video from two or more different cameras appears to provide a single contiguous scene. Transformation tool 443 may provide the single contiguous scene or "stitched" video by translating, rotating, scaling, or otherwise transforming a view from one camera to match a view provided by a second camera. For example, in FIG. 5A, video from "Cam 1" provides a first three-dimensional perspective view of a building front while "Cam 2" provides a second three-dimensional perspective view of the building front and one side. The transformation tool is configured to utilize information regarding the cameras and camera views to transform (e.g., by rotating, scaling, translating), for example, the video provided by "Cam 2" so that the combined video scene available to a user on a single electronic display system is "stitched" to be larger than that available from any one camera. Because of the transformation, the context of any individual camera view can be determined by a user of the system upon viewing the video. When a moving object (e.g., a truck) moves from being captured by a first camera to a second camera, the user can naturally "follow" the truck through the contiguous video scene provided via the "stiched" video. Operations and details relating to transformation tools that can be utilized with the video processing systems of the present application are described in greater detail in subsequent Figures and paragraphs.

Figure 4B:
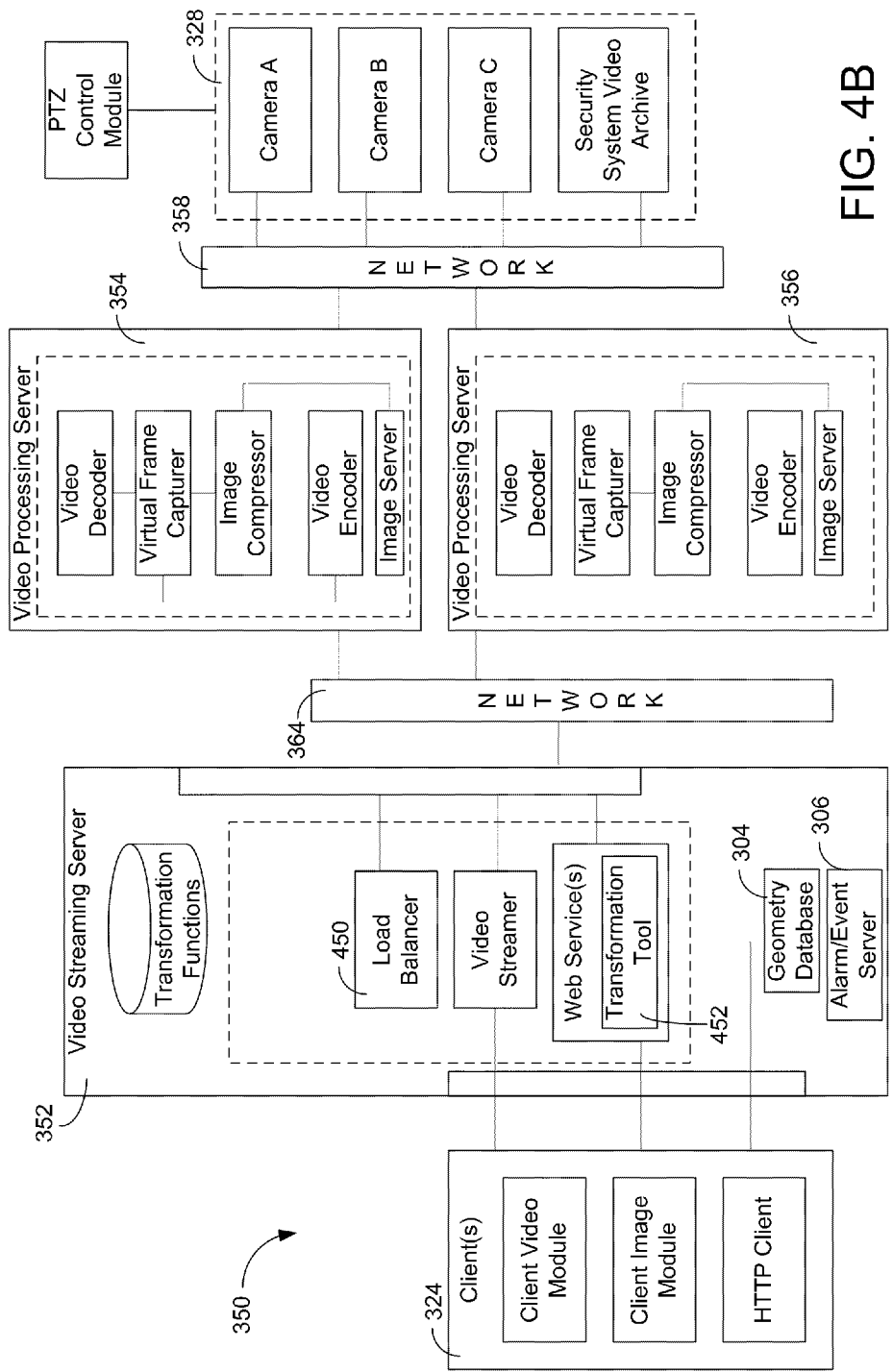
FIG. 4B is a more detailed block diagram of the system of FIG. 3C, according to an exemplary embodiment.

Referring now to FIG. 4B, a close-up block diagram of distributed system 350 shown in FIG. 3C is illustrated, according to an exemplary embodiment. System 350 is shown to include client(s) 324, video processing servers 354 and 356, video streaming server 352, and video sources 328. Significantly, in system 350, much of the video processing (e.g., the decoding, frame grabbing, and encoding) occurs in distributed manner (e.g., in distributed computers, in distributed processes, etc.). Depending on the number of clients requesting different video streams and the number of cameras providing video information to the system, one or more additional video processing servers can be brought on-line to provide increased processing capacity. Even if one or more video processing servers has adequate capacity, more or all video processing servers can be used with load balancer 450 to balance the processing load between on-line video processing servers. Network 358 may be a high-speed video bus configured so that when any video processing server is brought on-line, the server can determine which streams are available and begin receiving the video without having to undertake a complicated communication process with the individual cameras. Similarly, if a new camera or video source is brought online (e.g., with video according to a codec not being handled by an on-line video processing server), a new video processing server can be brought on-line to handle the codec. The various components common to FIGS. 4A and 4B may be configured differently or may be configured similarly. The web service(s) are shown to include a transformation tool 452 which may be configured as the transformation tool of FIG. 4A or as described in other Figures and paragraphs.

Exemplary Graphical User Interfaces

Referring now to FIG. 5A, an exemplary graphical user interface (GUI) view 500 that can be generated and displayed using the systems and methods described herein is shown, according to an exemplary embodiment. As shown in FIG. 5A, GUI view 500 is displayed on display screen 501. GUI view 500 is also shown as being within a browser window 501 (e.g., web-browser window). GUI view 500 is shown to include content portion 502, information portion 504, detail portion 506, personalization portion 508, and utility portion 510.

Content portion 502 is the portion in which one or more video feeds from the various video sources and cameras coupled to the video processing system are displayed and played back for a user. According to an exemplary embodiment, video from multiple cameras is shown as "stitched" together (e.g., joined, blended, etc.) to create a joined video 512 (e.g., a panoramic video, a stitched video, a joined video, an immersive video, a super-video, a wide-angle video, etc.). Content portion 502 is shown to include a tab (e.g., a user interface element) configured to allow a user to switch between the joined video and a video wherein the primary camera for the current joined video is zoomed in and shown alone. In the exemplary illustration of content portion 502 shown in FIG. 5A, "Cam 1" is the primary camera for the joined video and would be zoomed and maximized if a user were to click on the "Max View of Video" tab.

In FIG. 5A, content portion 502 is also shown to include a map window 514, according to an exemplary embodiment. Map window 514 is shown to be an overhead view (e.g., an iconal view of the environment shown in joined video 512 from an overhead location). Each of the cameras shown in joined video 512 (e.g., "Cam 1," "Cam 2," and "Cam 3") are displayed as a small icon in map window 514. The primary camera (e.g., "Cam 1") is shown as highlighted and map window 514 includes field of view lines for the primary camera to provide orientation for the user. An outline or icon for the structures shown within the joined video can also be shown (e.g., an icon is shown to represent the building displayed in the video). It should be noted that map window 514 can be used to provide an icon or other indicia of objects detected via video object detection and tracking technology (e.g., as described in U.S. application Ser. No. 12/036,053).

Content portion 502 is yet further shown to include a number of user interface controls (e.g., triangular elements 516 allowing the user to pan left, right, up, down, etc.). Yet further, content portion 502 is shown to include a zoom control 518 for allowing the user to cause the video to zoom in or out. Rotation control 520 is configured to provide the user with a user interface control for rotating the joined video. Forward/back control 522 is configured to provide the user with a user interface control for moving the "virtual viewpoint" provided by a series of cameras and joined video 512 forward or backward. Together user interface controls 514-522 provide the user with six degrees of navigational freedom relative to the environment captured by a series of video cameras spaced around the environment. For example, if the van shown in the video displayed in FIG. 5A were to drive around the building of the scene, the user could manipulate rotation control 520 to rotate the joined video 512 to follow the van. Further, if the van moved into the far field, the user could manipulate the forward button of forward/backward control 522 to change to a far field of video provided by another set of cameras (e.g., cameras providing far field video images 524).

The video processing system providing content portion 502 can be configured to automatically track objects captured by any of the cameras of the system (e.g., using technology described in U.S. application Ser. No. 12/036,053). When tracking the objects from camera to camera, the video processing system can automatically pan the video scene, rotate the video scene, zoom into the video scene, move the video scene forward or backward, change the view of the map window, etc. In this manner, the user of the system would not have to manually determine which user interface control to utilize to keep the moving object under surveillance. Rather, the joined video would move to provide a simulated three-dimensional immersion in the environment of the cameras to automatically track the object. Further, object recognition technology (e.g., to determine if the object being tracked is a human, a vehicle, a ball, or some other object) can be used by the video processing system to determine whether to zoom in on the object (e.g., so a human face can be viewed and/or recognized) or whether the camera should remain zoomed out. Yet further, if an object is determined to be a human but a face has not been processed by the system, the system can automatically rotate (or otherwise move/switch cameras) the joined video 512 to keep the user's face within the video. Content portion 502 can include added buttons or other user interface elements for toggling, switching, or otherwise selecting these modes. For example, an "automatically track object" button may be provided in content portion 502.

Map window 514 can also be configured for use with tracking technology. A small icon can be shown on the map for a detected object (e.g., an object detected and determined to be of interest). If a plurality of detected and moving objects are detected, an icon for each can be shown in map window 514 and available for selection by the user. Upon selection, the system will track (and automatically update joined video view 512 via rotations, movements, camera switching, etc.) the selected user. If a user would like to discontinue the auto-tracking, the user can de-select the object in map window 514. Further, objects for auto-tracking can be selected/de-selected in joined video 512 (e.g., via clicking on the object, etc.).

Information portion 504 is shown to include a navigation tree for viewing and selecting hardware devices of a building environment. Information for information portion 504 can be provided by a building automation system. Devices can be searched for, selected, configured, and the like. Reports can be generated relating to any of the devices. Detail portion 506 can be used to view detail about alarms, events, or video information. For example, in the illustration of FIG. 5A, a timeline for "Cam 1" is shown. The timeline can be a user-interactive control for allowing the user to select video portions, fast-forward, rewind, to conduct any other temporal video browsing tasks. Further, the video can be displayed as a "display carousel" as described in U.S. Provisional Application No. 61/093,189, filed on Aug. 29, 2008. Personalization portion 508 may allow a user to input filtering or searching selections regarding the devices of the building automation system, of the video system, and the like. Utility portion 510 can be used by the user to conduct any number of user activities (e.g., security-related activities, system management activities, etc.) such as diagnosing problems with the system, setting schedules, checking messages, setting reminders, and the like.

Figure 5B:
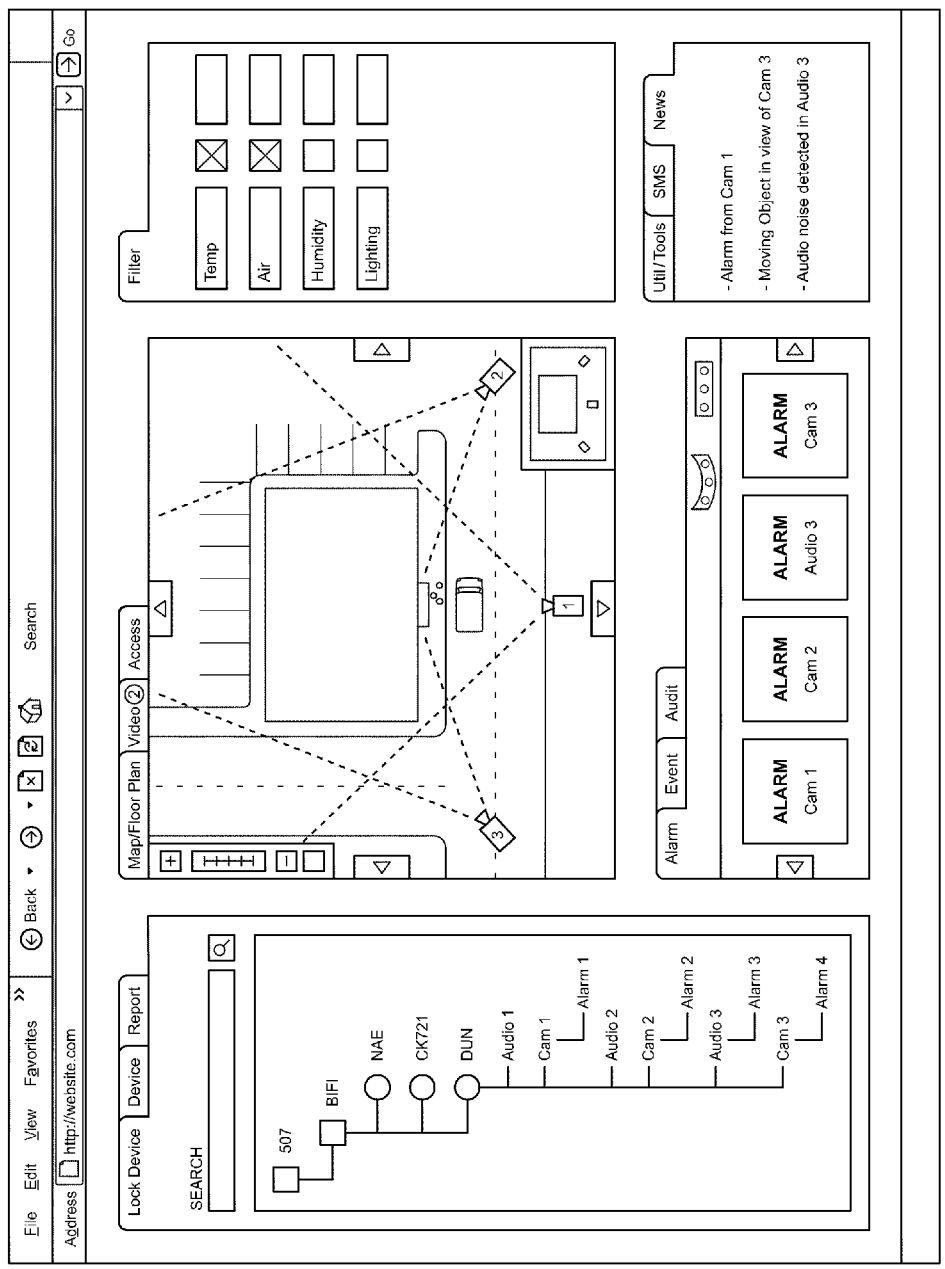
FIG. 5B is an illustration of another graphical user interface view that can be generated and displayed using the systems and methods of the present disclosure, according to an exemplary embodiment.

Referring now to FIG. 5B, an exemplary graphical user interface view that can be generated and displayed on the display screen using the systems and methods described herein is shown, according to an exemplary embodiment. The content portion of the GUI view is shown as a "bird's eye view" (e.g., top-down view) of the video environment shown in FIG. 5A. The view can be automatically generated based on geo-location information, and/or the map data of the system. Camera icons and field-of view lines, as shown, can be overlaid on the map or on an overhead image of the scene. The GUI shown in FIG. 5B can allow the user to navigate around the environment to identify a desired camera viewpoint for view display.

Creating an Stitched Video Scene Using Views from Multiple Cameras

A conventional way to relate video from multiple cameras is to manually obtain detailed information regarding precise camera location and precise camera parameters (e.g., pan, tilt, zoom, field of view, view depth, etc.) and to use the detailed information, with the assistance of many user input steps, to determine a mathematical relationship between a first camera view and a second camera view. Such conventional systems typically suffer from a number of challenges. First, video surveillance systems typically include movable cameras (e.g., pan, tilt, or zoom cameras) rather than stationary cameras. Second, cameras can often be bumped, rotated by the wind, replaced with other cameras, etc. Third, for systems with many cameras (e.g., a large campus) conducting mathematical calculations to associate and data from the many cameras becomes impractical.

According to an exemplary embodiment, a video processing system utilizes computerized processes to determine how to "stitch" together a video scene using views from multiple cameras. According to a preferred embodiment, once the cameras are physically installed and determined to be online and operational, the video processing system can process available information regarding the cameras and calculate mathematical relationships between camera views without human input or with minimal human input.

Figure 6A:
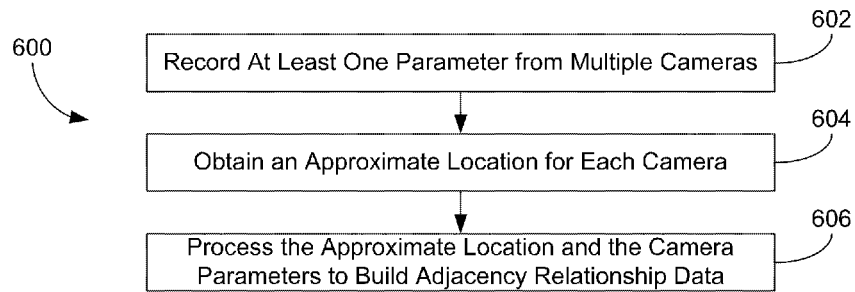
FIG. 6A is a flow chart of a process for providing stitched video, according to an exemplary embodiment.

Referring to FIG. 6A, a flow chart of a process 600 for providing stitched video is shown, according to an exemplary embodiment. Process 600 may generally obtain camera data for a plurality of cameras, including at least one movable camera, and use the camera data to determine camera or camera view adjacencies (i.e., information regarding which cameras or camera views are adjacent to each other).

Process 600 includes recording at least one parameter from multiple cameras, one of which may be a movable (e.g., PTZ) camera (step 602). According to an exemplary embodiment, the parameter may be or relate to, for example, a camera pointing direction, a camera model, a camera name, a camera type, a real world coordinate (e.g., a GPS coordinate), an elevation, a number of possible views, a focal length, a zoom level, a lens size, or any other camera property that may help determine the areas that the camera can view. According to an exemplary embodiment, the parameters are communicated from the cameras to the video processing system via a network (e.g., an IP network) and stored in the video processing system for processing (see, for example, the camera data of FIG. 6B).

Process 600 is further shown to include obtaining an approximate geospatial location for each camera (step 604). The geospatial location can be, for example, a user-entered location on a map (e.g., entered via site authoring tool 444 shown in FIG. 4A), a GPS coordinate (which may have an error of multiple meters), or another computer-derived parameter. Step 604 can also include determining a geometric representation of a field of view (for one or more possible views) of a camera. For example, a radius for a circular or semi-circular field of view for at least one possible view of each camera may be defined. According to an exemplary embodiment, the geometric representation of the field of view may be a two-dimensional shape or three dimensional shape. For example, the camera may store and communicate information regarding the vertical span (i.e., angle range) of its lens, the horizontal span of its lens, and the focal length for the lens; using this information a routine of the video processing server can be configured to generate a pyramid-shaped or cone-shaped geometric representation of the field of view of a camera.

Using the approximate geospatial location and the camera properties, adjacency relationship data may be built. The adjacency relationship data may be determined by processing the geometric representations (e.g., an approximate location)

that may be determined in step 604 and parameters as determined in step 602 (step 606). According to an exemplary embodiment, the adjacency relationship data may be built without manual input from a user. Adjacency relationship data may indicate if two (or more) cameras each have a view that covers a specified area. For example, in the example of FIG. 6C, view $V_3$ of Camera 1 is shown intersecting with view $V_1$ of Camera 3. Step 606 may include the determination that the two views ($C_1V_3$ and $C_3V_1$) are intersecting and may include storing adjacency data for the two cameras based on the determination of overlapping views.

Figure 6B:
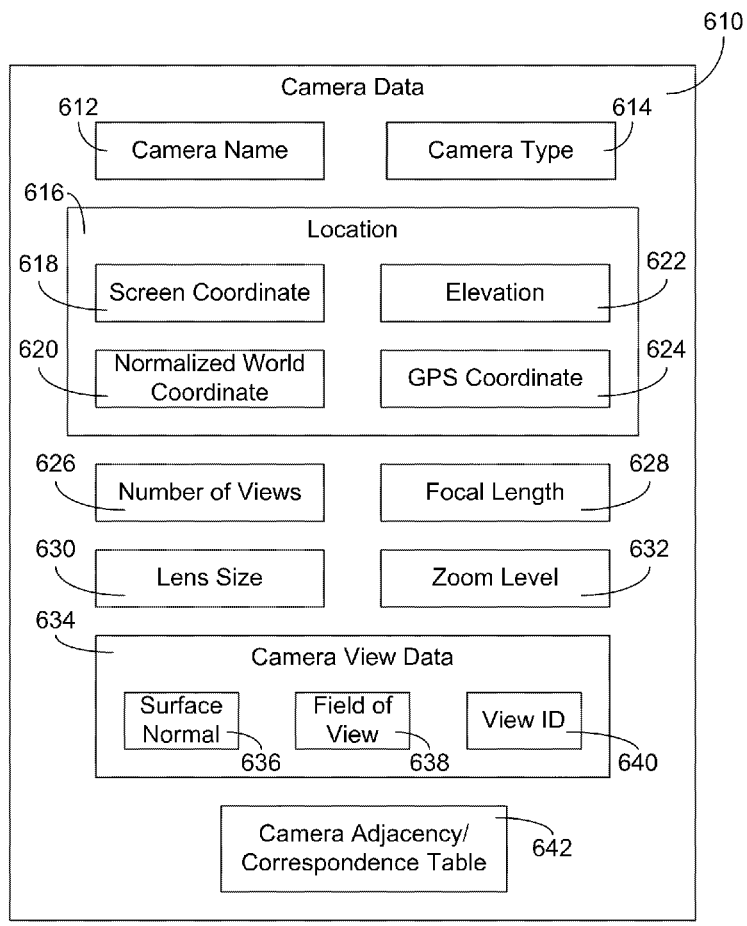
FIG. 6B is a block diagram for camera data organization and storage, according to an exemplary embodiment.

According to an exemplary embodiment, the output from step 606 is be adjacency relationship data. The adjacency relationship data can be a database, a linked list, a value pair or any other information structure configured to represent or relate two cameras (or camera views) as being adjacent to each other. According to the example shown in FIGS. 6C and 6D, linked lists are used to represent adjacency relationship data. 6D shows two linked lists, one for Camera $C_1$ (the camera labeled "1" in FIG. 6C) and another linked list for Camera $C_2$ (the camera labeled "2" in FIG. 6C). Camera $C_1$ is linked to its three views, $V_1$, $V_2$, and $V_3$. Each of the three views of camera $C_1$ is linked to an adjacent view. For example, Camera 1, view 1 (i.e., $C_1V_1$) is linked to camera 2, view 1 (i.e., $C_2V_1$). A video processing system may have built the linked list this way because the geometric representation of $C_2V_1$ intersected the geometric representation of $C_1V_1$. The linked list further includes each next view of Camera 1 being linked with another view from another camera that is determined to be adjacent to the view. For example, also referring to FIG. 6C, Camera 2 may have one view $V_1$ that is adjacent with Camera 1. Therefore, view $V_1$ may be linked to the views of Camera 1 in a linked list as shown. According to an exemplary embodiment, the process of adding cameras to the linked list may include a pruning step for removing duplicate associations (e.g., if view $V_1$ of Camera 3 is linked to Camera 1, then the link for view $V_1$ of Camera 1 to Camera 3 is removed since the two cameras are already linked).

Figure 6C:
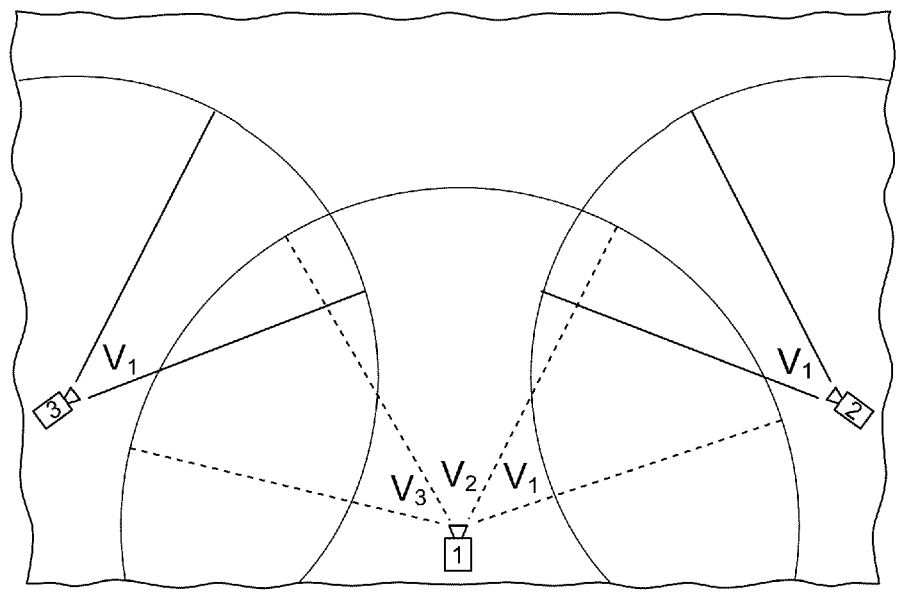
FIG. 6C is a view of cameras and fields of view associated with the cameras, according to an exemplary embodiment.
Figure 6D:
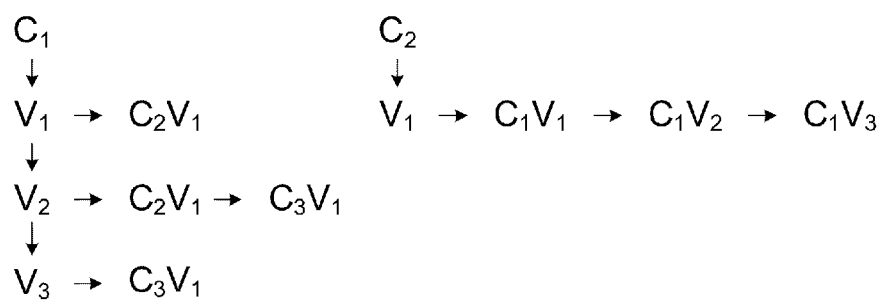
FIG. 6D is an illustration of a linked list used to associate adjacent camera and camera views, according to an exemplary embodiment.

The geometric representation of views or fields of view used by the processing system need not actually be generated and displayed as lines and semi-circles as they appear in FIG. 6C. Rather, an information structure configured to describe geometric boundaries or areas of a view or field of view can be calculated and stored for use by the processing system. As illustrated in FIG. 6C, the geometric representation can be a semi-circle. According to yet other exemplary embodiments, a semi-circle is not calculated for a field of view. Rather, using camera focal length and an approximated "x, y" location of the camera, a circle center and a circle radius are calculated and if any part of circles for two cameras intersect then the system determines that the cameras are adjacent.

Referring now to FIG. 6B, a block diagram of camera data 610 (e.g., camera info. 446 shown in FIG. 4A) is shown. Camera data 610 shown in FIG. 6B illustrates fields or data structures that describe camera properties and these fields or data structures may be stored for any camera of the system. Camera data 610 is shown to include a camera name 612, a camera type 614, camera location data 616, and camera view data 634, among other parameters.

Camera name 612 and camera type 614 may generally provide an identification of the camera for a system or a user of the system. Camera type 614 may indicate that the camera is a PTZ camera, a fixed camera, or another possible camera type. For both camera name 612 and camera type 614, and for many of the other camera parameters, while these may be expressly communicated to a processing system from a camera and stored in a field or other data structure unique to each camera, it should be understood that if a camera communicates some identifying information (e.g., a model number, a series number, etc.) the processing system may be configured to lookup or otherwise determine one or more camera properties, such as camera type, using the identifying information.

Camera location data 616 is shown to include screen coordinates 618, normalized world coordinates 620, an elevation 622, and GPS coordinates 624, but may include any type of geospatial location information. Screen coordinates 618 may relate the camera to coordinates on a graphical user interface-based map or floor plan (or other computer-generated view or representation of an area). For example, via site authoring tool 444 of FIG. 4A, a user may be prompted to place cameras (e.g., before, while or after installing the cameras at the location) on the floor plan or map. The system may store this location, in the form of screen coordinates or otherwise, and use this information in the activity of FIG. 6A to build the adjacency relationship data. Normalized world coordinates 620 may indicate where the camera is located in the "real world" and may be an estimate, for example, of a latitude or longitude. Elevation 622 data may include the elevation or height of the camera which may be sensed by the camera (e.g., via a GPS module), estimated by a user, estimated by the camera or a video processor conducting one or more analysis activities of video obtained by the camera, etc. GPS coordinates 624 can be coordinates obtained by a GPS receiver in the camera, GPS coordinates entered by a user when installing the camera or after installing the camera, or otherwise.

Camera data 610 may additionally include camera parameters such as a number of views 626 which may be a representation or calculation regarding the number and type of views that the camera can provide. Camera data 610 may additionally include the focal length 628 of the camera, the lens size 630 of the camera, and the zoom levels 632 of the camera. Camera parameters 626-632 may be generally used with other camera properties to determine the size or shape of the area that the camera is configured to view. For example, camera parameters 626-632 (or other parameters stored in camera data 610 or otherwise) can be utilized to determine the geometry (e.g., boundaries, areas) for a view or field of view for a camera which may be used to build the adjacency relationship data.

Camera data 610 is shown to include camera view data 634. Camera view data 634 may include surface normal data 636, field of view data 638, and view ID 640. Surface normal data 636 may be a representation of the surface normal to the view plane. Field of view data 638 may relate to an area (e.g., angle and depth) that each view provided by the camera can capture. View ID 640 may be used to identify and label the potential views of the camera. Camera data 610 may further include a camera adjacency or correspondence table or database 642. Table 642 may generally store information relating to adjacency data between various cameras. According to various exemplary embodiments, camera adjacency or correspondence table or database 642 can be stored in another data store or information structure of a related video processing system.

Once the adjacency relationship data is built or formed, a video processing system as shown and described herein may be configured to process video images obtained from cameras to determine transformation functions for providing stitched video as described and shown with reference to FIG. 5A.

Figure 7:
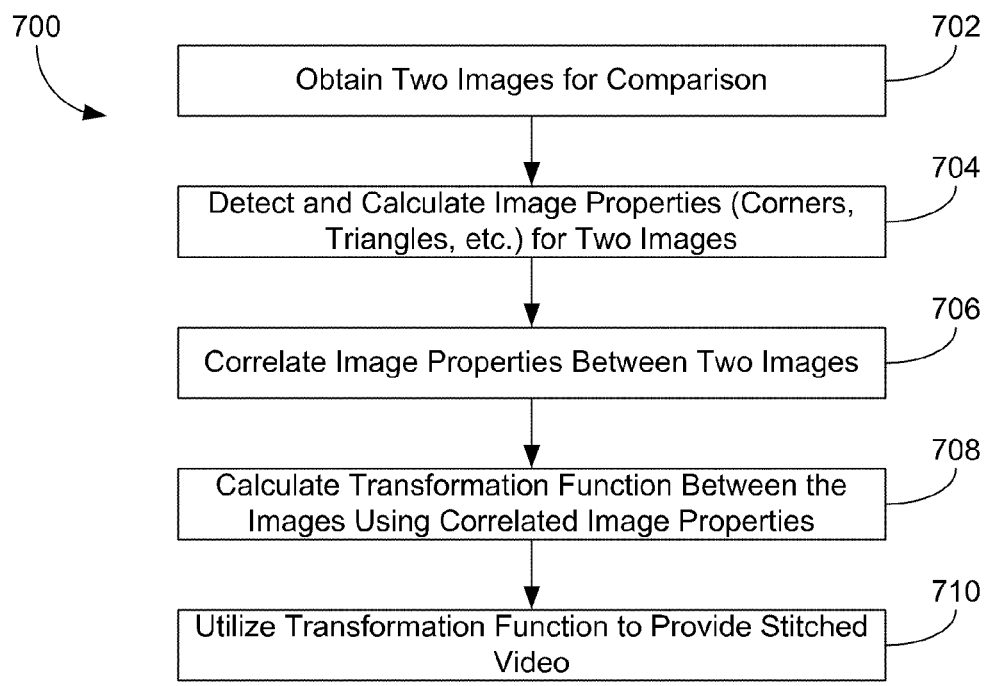
FIG. 7 is a flow chart for receiving images and outputting a image based on the input images, according to an exemplary embodiment.

Referring now to FIG. 7, a flow chart of a process 700 for providing stitched video is shown, according to an exemplary embodiment. Process 700 may include obtaining two images from two cameras for comparison (step 702). According to various exemplary embodiments, process 700 may be repeated for any number of cameras or images. Once obtained, image properties of the two images may be detected and calculated (step 704). Image properties may include corner points, triangles formed by the objects in the image or other data relating to the objects or space shown in the image. The images will almost always be two dimensional "flat" images, and the detection and calculation of image properties is completed by processing the two dimensional information in the images for pixel patterns that appear to resemble, for example, corners or other objects. Using the detected or calculated image properties for each image, correlations between the image properties may be formed (step 706). Using the correlations between the image properties, a transformation function may be calculated between the two images (step 708). The transformation functions between images can be used to determine a surface normal for each view of a camera. In other words, the transformation functions can be used to determine the parameters of a vector perpendicular to the plane of a camera view. With multiple surface normal vectors calculated, and knowing the approximate locations of each camera, a video processing system may be configured to use the surface normals (or the transformation functions calculated in step 708 directly) to render images that are stitched such that a three-dimensional perspective view from a first camera is adjacent to and combined with a three-dimensional perspective view from a second camera when showed to a user. By storing the surface normals or the transformation functions in memory, the system that generates or renders the graphical user interface (e.g., as shown in FIG. 5A) can render changes in the stitched video "on the fly" while the user navigates through the scene (e.g., by utilizing user interface elements of the graphical user interface). Accordingly, the transformation function may be used for stitching images and/or video from multiple cameras (step 710) in a number of different ways.

Figure 8A:
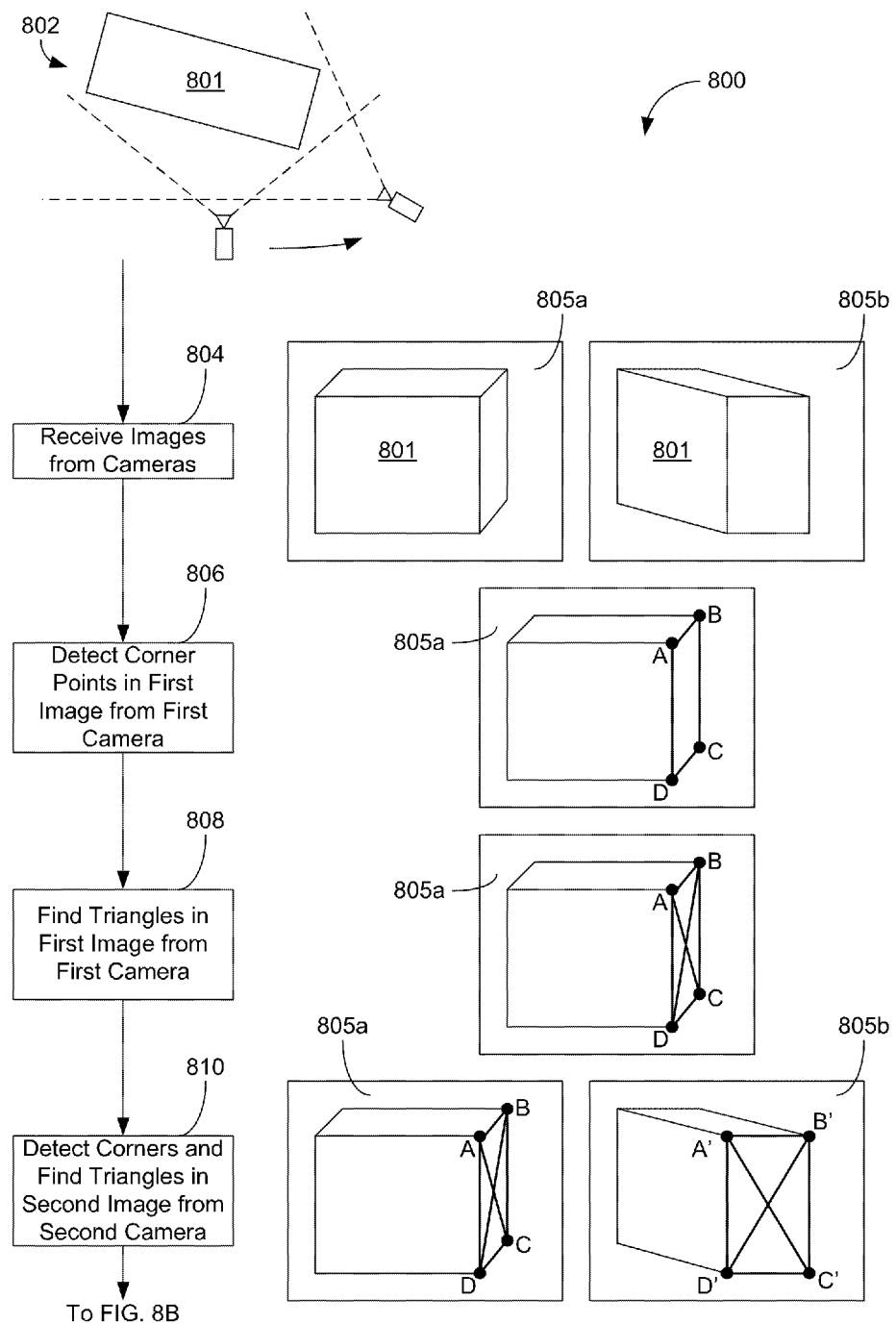
FIGS. 8A-C are flow diagrams and illustrations of a process for receiving images from two cameras and determining a transformation function between two images from the two cameras, according to an exemplary embodiment.

Referring now to FIG. 8A, a flow chart of a more detailed process 800 for video stitching is shown, according to an exemplary embodiment. Process 800 may be generally used to determine parameters regarding the two cameras sufficient to "stitch" the video or images from the camera together to form a single video scene with a common perspective. According to an exemplary embodiment, process 800 can be repeated for every potential view or camera adjacency determined by the systems and processes described earlier (particularly those described with reference to FIGS. 6A-6D).

Environment 802 shows a building 801 with two cameras having two views of building 801. The approximate locations of the cameras are known, and the cameras are estimated to be adjacent. Accordingly, the two views are provided to a process 800 (e.g., which may include providing a data structure describing the two views to a computerized function). Process 800 includes receiving images from the cameras (step 804). Two images 805a, 805b show building 801 from the differing perspective of the two cameras. The images may be frames from video taken at the same time of day so that lighting levels are the same.

Process 800 is shown to include detecting corner points in first image 805a (step 806). The detection of corner points can be detected using a "Harris Corner Detector" or another suitable image processing algorithm. Such an algorithm may include, for example, sampling many groups of pixels of first image 805a to determine if features (e.g., lines) of the image intersect in a way that indicates a corner or an edge. Accordingly, a simplified result of a corner detection routine may be shown as labeled corners A, B, C, D of building 801. Output from a real-world corner detector will be much noisier than that illustrated in FIG. 8A. For example, many tens, hundreds, or more of corners may be detected in any given image.

Accordingly, step 806 (or a subsequent step) may include discarding a number of the corners, discarding a percentage of the corners, or otherwise filtering the output from the corner detector. In other embodiments, the corner detection algorithm may be configured to run with a certain degree of confidence such that unwanted corners are not detected.

Using the detected corners, process 800 is further shown to include finding or forming triangles among the corner points (step 808). This step may be initiated by passing a triangulation routine the sets of corners points (or points of other features detected). In an exemplary embodiment, a "Delaunay triangulation" algorithm can be used to find and calculate the triangles. Other suitable algorithms for finding triangles may also be used. For example, in relative to image 805a, triangles ABC, BCD, ABD, and ACD may be formed using the corner points detected in step 806. Steps 806-808 may be repeated for second image 805b. Particularly, corner points and triangles may be found for second image 805b (step 810). Corner points A', B', C', D' and corresponding triangles are shown on second image 805b. For each triangle (which may be called a facet) found via the triangulation algorithm, a centroid (i.e., center point) for the triangle may be detected and "small" triangles may be removed or otherwise filtered from the triangle set (the triangles for each view may be described and stored in a linked list or another data structure) for an image. For example, triangles not of a certain area threshold may be removed.

Figure 8B:
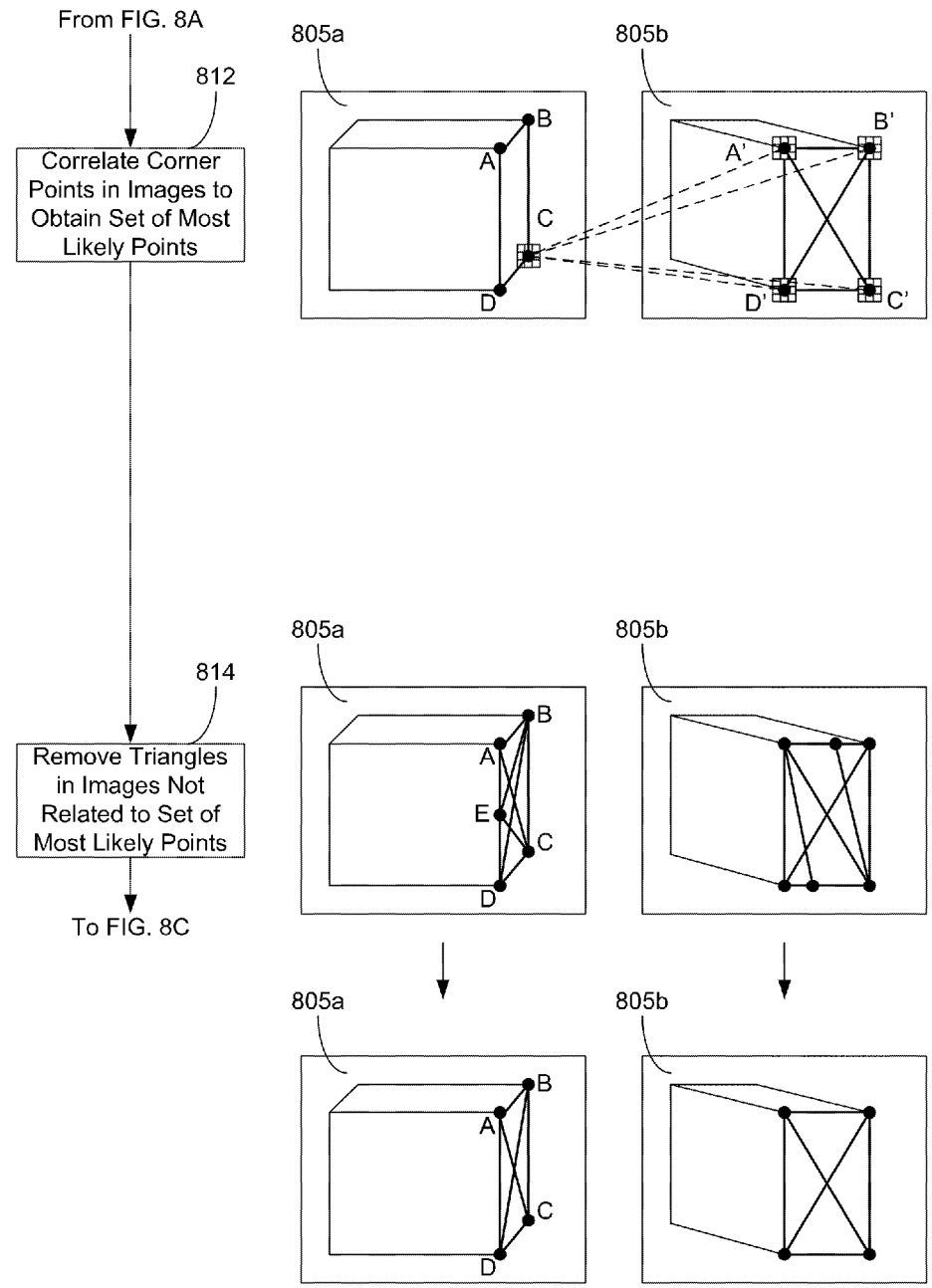

Referring now to FIG. 8B, the corner points of images 805a, 805b may be correlated in order to obtain a set of most likely points (MLPs) (step 812). For example, corner point C of image 805a may be checked for "overlap" or correlation with each of points A', B', C', and D' of image 805b. According to an exemplary embodiment, a scale-invariant feature transform (SIFT) algorithm may be used in this correlation. More particularly, a scale-invariant feature transform may be applied to both of images 805a and 805b and then both outputs would be compared. A SIFT algorithm detects and describes features in images. Accordingly, the described features for each image may be compared. According to an exemplary embodiment, a number of pixels surrounding a corner point (i.e., of a triangle) are described using SIFT and compared to other pixel groups relating to corners in the other image. This activity is illustrated in FIG. 8B where point C in 805a is surrounded by a number of pixels for consideration by SIFT and for comparison to points (and surrounding pixels) in image 805b. According to an exemplary embodiment, the output from any point to points comparison of SIFT descriptions is a "most positive pair" for each point in the first image. In other words, pairs of corresponding points between images will be built.

At this step (or in one or more of the other steps) a threshold or another algorithm may be used to determine whether the estimated image adjacency determined earlier was false. In other words, a routine may be configured to determine that there is not enough correlation between images or image features to proceed with relating views and "stitching" video from the views.

Triangles (and corner points) of images 805a, 805b not related to the set of MLPs or "positive pairs" determined in step 812 may be removed from the images (step 814). For example, in image 805a, a point E that may be detected in image 805a is shown that does not have a corresponding point in image 805b. Thus, point E and all triangles including point E are shown removed in image 805a.

For each triangle (step 816), and using the output from the SIFT routines, a corresponding triangle may be found in second image 805b (step 818). For each possible triangle match discovered in steps 816-818 (step 820), a transformation function between the triangles may be computed (step 822). For each triangle in first image 805a, a surface normal to the triangle may be calculated (using any number of triangulation or triangle analysis algorithms). Computing the transformation function, or as an output to the transformation function, for each triangle an X-Y plane, a Y-Z plane, and an X-Z plane may be considered. For each plane, a triangle's normal vectors and average vectors may be calculated and the angle between the normal and average normal vectors for each projected plane may be derived. Computing the transformation function between triangles may include determining how the triangle has been scaled, translated, and rotated from the first image to the second image. According to one exemplary embodiment, an inverse matrix function may be used (e.g., a scale matrix, translation matrix, and rotation matrix representing the scaling, translation, and rotation of a point from one image to the other may be used to determine the transformation function). According to one exemplary embodiment, a standard deviation for each triangle transformation may be found. Using the triangle transformation functions calculated in steps 820-822, an image (e.g., aggregate, average, etc.) transformation function between the two images may be calculated (step 824)

Any noise may be pruned from the set of transformation functions (step 826) and a final image transformation function may be output (step 828). The transformation function may be used to provide stitched video or images from two or more cameras. The transformation function may represent the average of the surface normal transformations of the triangles in the images, according to an exemplary embodiment.

Figure 9:
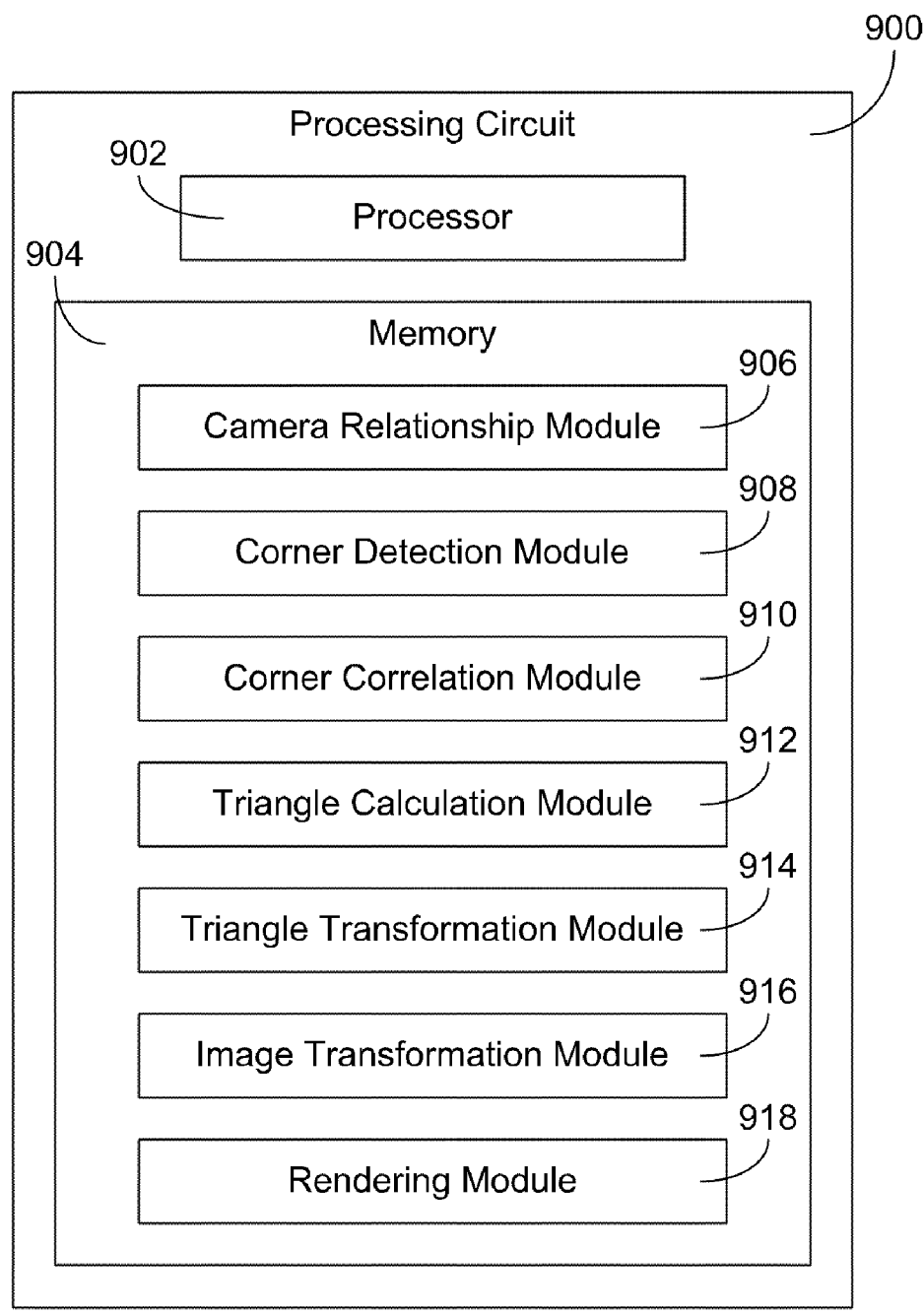
FIG. 9 is a block diagram of a processing circuit used for the systems and methods of the present disclosure, according to an exemplary embodiment.

Referring to FIG. 9, a detailed block diagram of a processing circuit 900 for use with the systems and methods of the present disclosure is shown, according to an exemplary embodiment. Processing circuit 900 is shown to include a processor 902 and memory 904. Processor 902 may be a general purpose processor, an application specific processor, a circuit containing processing components, a group of distributed processing components, a group of distributed computers configured for processing, etc. Processor 902 may be or include any number of hardware components for conducting data or signal processing or for executing computer code stored in memory. Processing circuit 900 may be generally coupled to communications electronics for receiving inputs from multiple cameras and for providing an output to a display system or otherwise.

Memory 904 may include various modules for executing the systems and methods of the present disclosure. Memory 904 includes a camera relationship module 906. Camera relationship module 906 may be generally configured to build and store adjacency relationship data between two or more cameras. For example, module 906 may store adjacency relationship data as determined in step 606 of process 600 of FIG. 6A. Camera relationship module 906 may use approximate geospatial location information, camera parameters, and any other camera property determined by the systems and methods of the present disclosure. Camera relationship module 906 may further be configured to use the adjacency relationship data to determine which cameras to process for corner correlations in module 910.

Memory 904 further includes corner detection module 908. Corner detection module 908 may be generally configured to accept an input (e.g., an image) from a camera and detect corner points in the provided input. For example, also referring to step 806 of process 800 of FIG. 8A, corner detection module 908 may use a Harris corner detector or other system or method for determining corner points for an image. Corner detection module 908 may further store the determined corner points.

Memory 904 further includes corner correlation module 910. Corner correlation module 910 may generally be configured to use corner points determined by corner detection module 908 to correlate a plurality of corner points from one image to a plurality of corner points from a second image. The correlation may be used to obtain a set of most likely pairs (e.g., a correspondence of points from one image to the second image). Corner correlation module 910 may sort correlations of corner points in the two images to select a top number of corner pairs or a top percentage of corner pairs to obtain the set of most likely pairs. For example, also referring to step 812 of process 800 of FIG. 8A, corner correlation module 910 may be used to correlate each corner point from one image to a corner point from a second image.

Memory 904 further includes triangle calculation module 912. Triangle calculation module 912 may generally use the corner points relating to the set of most likely pairs determined by corner correlation module 910 to calculate triangles. For example, also referring to step 808 of process 800 of FIG. 8A, triangles relating to the corner points detected in an image may be calculated by triangle calculation module 912.

Figure 8C:
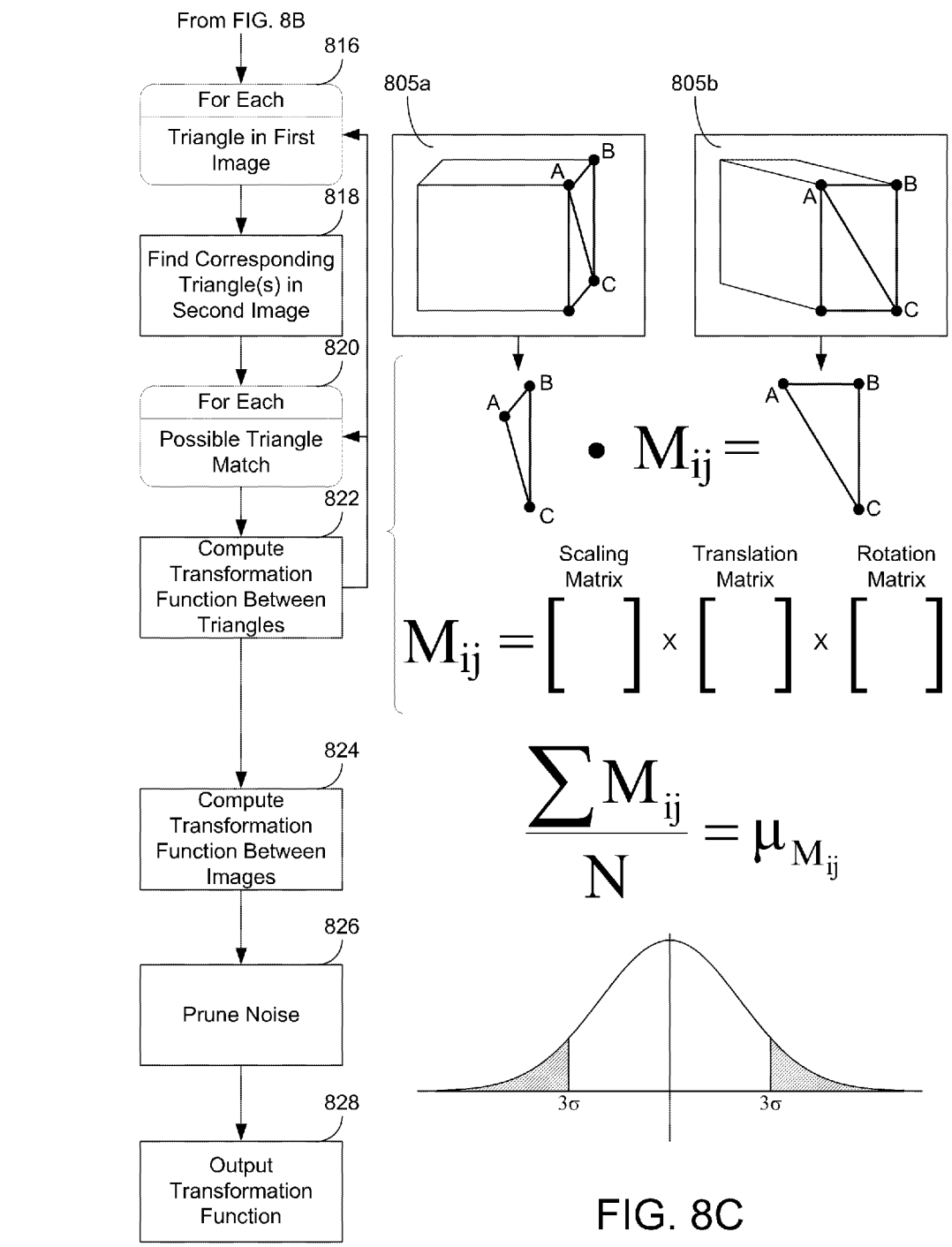

Memory 904 further includes triangle transformation module 914. Triangle transformation module 914 may be generally used to calculate a transformation function between all triangle matches between the first and second image having a high correlation. Triangle transformation module 914 may take a calculated triangle from triangle calculation module 912 from a first image and a calculated triangle from triangle calculation module 912 from a second image and calculate a transformation function between the triangles. For example, also referring to steps 816-822 of process 800 of FIG. 8C, triangle transformation module may use triangles from triangle calculation module 912 and a set of most likely pairs from corner correlation module 910 to find a corresponding triangle in a second image for a triangle in a first image. For each triangle match found by triangle transformation module 914, a transformation function may be computed for the triangles.

Memory 904 further includes image transformation module 916. Image transformation module 916 may generate a transformation function between two cameras. Image transformation module 916 may use triangle transformation functions as determined by triangle transformation module 914 and use the transformation functions to compute a transformation function between the images the triangles originated from. For example, also referring to step 824 of FIG. 8C, the image transformation function may be an average of the transformation functions for the triangle matches of the images. According to an exemplary embodiment, computed transformation functions that deviate from the average may be removed by image transformation module 916 without using the function in the calculation. Image transformation module 916 may further include a step for pruning noise and smoothing the function (e.g., via step 826 of process 800).

The transformation functions calculated using modules 914-916 may describe at least one of a scale transformation between two images, a translation transformation between two images, or a rotation transformation between two images. According to one exemplary embodiment, the scale transformation, translation transformation, and rotation transformation may be represented in matrix form, and an inverse matrix calculation may be used to determine an overall transformation function.

Memory 904 further includes rendering module 918. Rendering module 918 may be generally used to utilize a transformation function (e.g., a transformation function determined by image transformation module 916 for two images) to transform a perspective view (or other view) provided from a first camera with a perspective view (or other view) provided by a second camera. Rendering module 918 may use the transformation function to transform video from a camera to provide a stitched video between two cameras for an electronic display system. According to an exemplary embodiment, a process may calculate and store transformation functions (or other camera view parameters (e.g., the surface normal)) on a "batch processing" basis for each possible view of a movable camera. Accordingly, as a user manipulates a graphical user interface, rendering module 918 uses the stored view information to conduct the "stitching" and to provide an immersive video display to the graphical user interface.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

One embodiment relates to a system for providing stitched video from a plurality of cameras to an electronic display system. The system includes a processing circuit configured to associate a view of the movable camera with an approximate geospatial location and to build adjacency relationship data between the plurality of cameras and at least one moveable camera using the approximate geospatial location. The processing circuit is further configured to transform video from the camera relative to video from at least another of the plurality of cameras. The transformation is based on the adjacency relationship data and the processing circuit is further configured to use the transformed video to cause the stitched video to be provided to the electronic display system.

Another embodiment relates to a system for providing stitched video from a plurality of cameras when at least one camera is movable to an electronic display system. The system includes a processing circuit configured to detect corners in a first image from a first camera and to detect corners in a second image from a second camera. The processing circuit is further configured to correlate a plurality of detected corner points in the first image and the second image to obtain a set of most likely pairs. The processing circuit is further configured to calculate triangles formed by corner points relating to the set of most likely pairs. The processing circuit is further configured to correlate calculated triangles in the first image with calculated triangles in the second image. The processing circuit is further configured to compute a transformation function between the correlated triangles. The processing circuit is further configured to utilize the transformation function to transform video from the cameras to provide the stitched video to the electronic display system.

Another embodiment relates to a computer program product including a computer usable medium having computer readable program code embodied therein. The computer readable program code is adapted to be executed to implement a number of steps. The steps include detecting corners in a first image from a camera and detecting corners in a second image from a second camera. The steps further include correlating detected corners in the first image and the second image to obtain a set of most likely pairs. The steps yet further include calculating triangles formed by corner points of the set of most likely pairs. The steps also include computing a transformation function between correlated triangles and utilizing the transformation function to transform a three-dimensional perspective view provided by the first camera to match a three-dimensional perspective view provided by the second camera.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing stitched video from a plurality of cameras to an electronic display system, comprising:
 a processing circuit configured to detect corners in a first image from a first camera and to detect corners in a second image from a second camera;

wherein the processing circuit is further configured to correlate a plurality of detected corner points in the first image and the second image to obtain a set of most likely pairs;

wherein the processing circuit is further configured to calculate triangles formed by corner points relating to the set of most likely pairs;

wherein the processing circuit is further configured to correlate calculated triangles in the first image with calculated triangles in the second image;

wherein the processing circuit is further configured to compute a transformation function between the correlated triangles;

wherein the processing circuit is further configured to utilize the transformation function to transform video from at least one of the first camera and the second camera to provide the stitched video to the electronic display system.

2. The system of claim 1, further comprising:

communications electronics configured to receive the first image and the second image from the first camera and the second camera; and wherein the processing circuit comprises a rendering module that utilizes the transformation function to transform a perspective view provided by the first camera to match a perspective view provided by the second camera.

3. The system of claim 2, wherein the transformation function describes at least a scale transformation, a translation transformation, and a rotation transformation of the video from the camera.

4. The system of claim 3, wherein the processing circuit further comprises:

a corner detection module configured to detect the corners in the first image and the second image.

5. The system of claim 4, wherein the processing circuit further comprises:

a corner correlation module configured to correlate the plurality of detected corner points in the first image and the second image, wherein the corner correlation module is configured to sort correlations of corner points in the first and second images and to select at least one of a top number of corner pairs and a top percentage of corner pairs to obtain the set of most likely pairs.

6. The system of claim 5, wherein the processing circuit further comprises a camera relationship module configured to build relationship data between the plurality of cameras and the at least one camera using approximate location information and camera parameter information from each camera.

7. The system of claim 6, wherein the processing circuit utilizes the adjacency relationship data to determine which cameras of the plurality of cameras to process for corner correlations.

8. The system of claim 7, wherein the processing circuit further comprises a triangle transformation module configured to compute a transformation function between all triangles of the first image and the second image having a high correlation.

9. The system of claim 8, wherein the processing circuit further comprises an image transformation module configured to calculate an average of the computed transformation functions and to exclude computed functions deviating from the average to provide a final transformation function between the first camera and the second camera.

10. A computer program product, comprising a non-transitory computer usable medium having computer readable program code embodied therein, the computer readable program code adapted to be executed to implement steps comprising:

detecting corners in a first image from a first camera;

detecting corners in a second image from a second camera;

correlating the detected corners in the first image and the second image to obtain a set of most likely pairs;

calculating triangles formed by corner points of the set of most likely pairs;

computing a transformation function between correlated triangles; and utilizing the transformation function to transform a perspective view provided by the first camera to match a perspective view provided by the second camera.

11. The computer program product of claim 10, wherein the steps further comprise:

providing a system comprising distinct software modules;

wherein the distinct software modules comprise a corner detection module, a corner correlation module, a triangle calculation module, a triangle transformation module, an image transformation module, and a rendering module.

12. The computer program product of claim 11, wherein the corner detection module is configured to detect the corners in the first image and the second image and wherein the corner correlation module is configured to correlate a pair of points.

13. The computer program product of claim 12, wherein the triangle calculation module is configured to calculate the triangles formed by the corner points of the set of most likely pairs; and wherein the triangle transformation module is configured to compute a transformation function between all triangle matches between the first image and the second image having a high correlation.

14. The computer program product of claim 13, wherein the image transformation module is configured to calculate an average of the computed transformation functions and to exclude computed transformation functions deviating from the average to provide a final transformation function between the first camera and the second camera; and wherein the rendering module is configured to utilize the final transformation function to complete the transformation from the perspective view provided by the first camera to match the perspective view provided by the second camera.

15. The computer program product of claim 14, wherein the distinct software modules further comprise a camera relationship module configured to build adjacency relationship data between the plurality of cameras and the at least one camera using approximate location information and camera parameter information from each camera, and wherein the camera relationship module is further configured to utilize the adjacency relationship data to determine which cameras of the plurality of the cameras to process for corner correlations by the corner detection module.

* * * * *